US012812667B2

(12) United States Patent
Selvanesan et al.

(10) Patent No.: US 12,812,667 B2
(45) Date of Patent: Nov. 24, 2026

(54) SIDELINK, SL, INTERLACING CONFIGURATIONS

(71) Applicant: Fraunhofer-Gesellschaft zur Förderung der angewandten Forschung e.V., Munich (DE)

(72) Inventors: Sarun Selvanesan, Berlin (DE); Thomas Fehrenbach, Berlin (DE); Baris Göktepe, Berlin (DE); Thomas Wirth, Berlin (DE); Thomas Schierl, Berlin (DE); Cornelius Hellge, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 178 days.

(21) Appl. No.: 18/593,912

(22) Filed: Mar. 3, 2024

(65) Prior Publication Data

US 2024/0205948 A1 Jun. 20, 2024

Related U.S. Application Data

(63) Continuation of application No. PCT/EP2022/074325, filed on Sep. 1, 2022.

(30) Foreign Application Priority Data

Sep. 3, 2021 (EP) .................................... 21194876

(51) Int. Cl.

| | |
|---|---|
| ***H04W 72/40*** | (2023.01) |
| ***H04W 28/26*** | (2009.01) |
| *H04W 92/18* | (2009.01) |

(52) U.S. Cl.
CPC .......... *H04W 72/40* (2023.01); *H04W 28/26* (2013.01); *H04W 92/18* (2013.01)

(58) Field of Classification Search
CPC ..... H04W 72/40; H04W 28/26; H04W 92/18; H04W 72/0453; H04W 72/25;
(Continued)

(56) References Cited

U.S. PATENT DOCUMENTS

| | | | | |
|---|---|---|---|---|
| 12,549,963 | B2 * | 2/2026 | Srinivasan ............ | H04W 24/02 |
| 2021/0091901 | A1 * | 3/2021 | Sun ...................... | H04L 5/0007 |

(Continued)

OTHER PUBLICATIONS

5G; NR; Multiplexing and channel coding (3GPP TS 38.212 version 16.6.0 Release 16).

(Continued)

*Primary Examiner* — Afshawn M Towfighi
(74) *Attorney, Agent, or Firm* — PV IP PC; Wei Te Chung

(57) ABSTRACT

A device comprises a wireless interface, the device being configured for communicating in a wireless communication network using sidelink communication over a sidelink; the sidelink being operated so as to comprise a plurality of subchannels, each subchannel having at least one physical resource block, PRB, —the sidelink being operated such that the plurality of subchannels form a plurality of interlaces, each interlace comprising a disjoint subset of the plurality of subchannels. The subchannels or PRBs of an interlace are arranged in a discontinuous manner in the frequency range. The device is to select at least one interlace for communication from the plurality of interlaces.

18 Claims, 18 Drawing Sheets

(58) Field of Classification Search
CPC ... H04L 5/0037; H04L 5/0094; H04L 5/0091; H04L 5/0041
See application file for complete search history.

(56) References Cited

U.S. PATENT DOCUMENTS

| | | | | |
|---|---|---|---|---|
| 2021/0092783 | A1* | 3/2021 | Sun | H04L 5/0055 |
| 2021/0105760 | A1* | 4/2021 | Chen | H04L 27/2601 |

OTHER PUBLICATIONS

3rd Generation Partnership Project; Technical Specification Group Radio Access Network; NR; Physical channels and modulation (Release 16).

3rd Generation Partnership Project; Technical Specification Group Radio Access Network; NR; Physical layer procedures for data (Release 16).

International Search Report in International application No. PCT/EP2022/074325, mailed on Jan. 19, 2023.

Written Opinion of the International Search Authority in International application No. PCT/EP2022/074325, mailed on Jan. 19, 2023.

"3rd Generation Partnership Project; Technical Specification Group Radio Access Network; NR Physical layer procedures for data (Release 16)", 3GPP Standard Technical Specification; 3GPP TS 38.214, 3rd Generation Partnership Project(3GPP), Mobile Competence Centre; 650, Route Des Lucioles; F-06921 Sophia-Antipolis Cedex; France, vol. RAN WG1, No. V16.4.0 Jan. 8, 2021(Jan. 8, 2021), pp. 1-169, XP051999688.

* cited by examiner

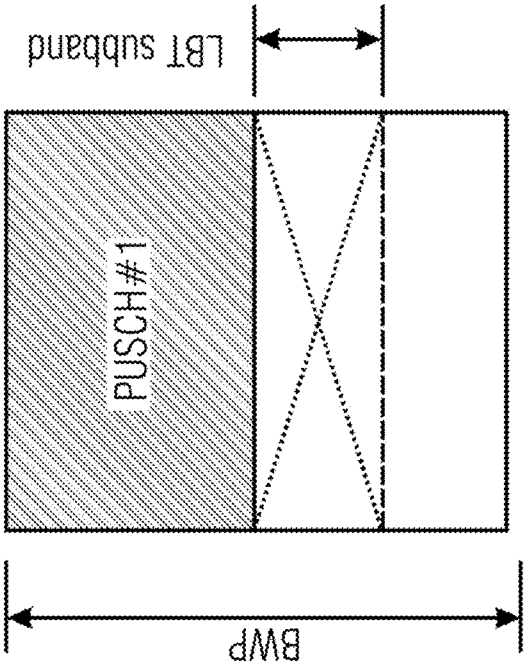
FIG. 6B
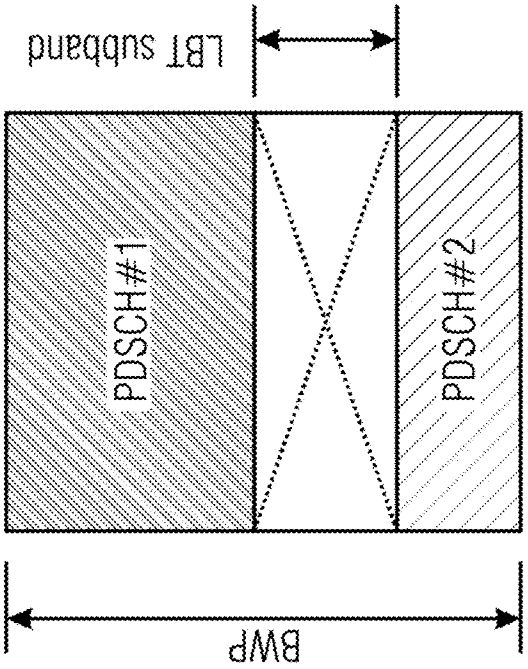
FIG. 6A
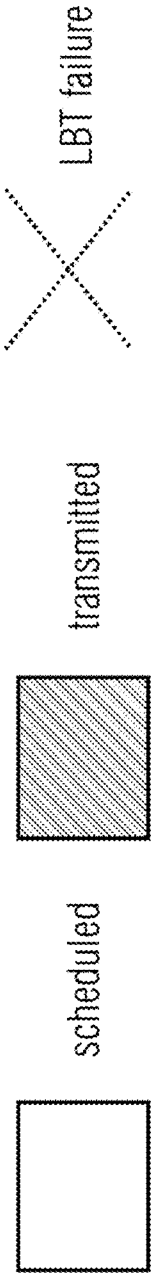

Table 6.1.2.2.3-1: $m_0$ and l for RIV ≥ M(M+1)/2.

| RIV - M(M+1)/2 | $m_0$ | l |
|---|---|---|
| 0 | 0 | {0, 5} |
| 1 | 0 | {0, 1, 5, 8} |
| 2 | 1 | {0, 5} |
| 3 | 1 | {0, 1, 2, 3, 5, 6, 7, 8} |
| 4 | 2 | {0, 5} |
| 5 | 2 | {0, 1, 2, 5, 6, 7} |
| 6 | 3 | {0, 5} |
| 7 | 4 | {0, 5} |

FIG. 7

Table 4.4.4.6-1: The number of resource block interlaces.

| $\mu$ | M |
|---|---|
| 0 | 10 |
| 1 | 5 |

FIG. 8

```
SL-ResourcePool : : =          SEQUENCE {
OPTIONAL,    -- Need M
    sl-Interlace-Config                sl-Interlace-Config
    sl-PSCCH-Config-r16                SetupRelease { SL-PSCCH-Config-r16 }
OPTIONAL,    -- Need M
    sl-PSSCH-Config-r16                SetupRelease { SL-PSSCH-Config-r16 }
OPTIONAL,    -- Need M
    sl-PSFCH-Config-r16                SetupRelease { SL-PSFCH-Config-r16 }
OPTIONAL,    -- Need M
    sl-SyncAllowed-r16                 SL-SyncAllowed-r16
OPTIONAL,    -- Need M
    sl-SubchannelSize-r16              ENUMERATED { n10, n12, n15, n20, n25, n50, n75, n100}
OPTIONAL,    -- Need M
    dummy                              INTEGER (10. .160)
OPTIONAL,    -- Need M
    sl-StartRB-Subchannel-r16          INTEGER (0. . 265)
OPTIONAL,    -- Need M
    sl-NumSubchannel-r16               INTEGER (1. . 27)
OPTIONAL,    -- Need M
    sl-Additional-MCS-Table-r16        ENUMERATED {qam256, qam64LowSE, qam256-qam64LowSE}
OPTIONAL,    -- Need M
    sl-ThreshS-RSSI-CBR-r16            INTEGER (0. . 45)
OPTIONAL,    -- Need M
    sl-TimeWindowSizeCBR-r16           ENUMERATED {ms100, slot100}
OPTIONAL,    -- Need M
    sl-TimeWindowSizeCR-r16            ENUMERATED {ms1000, slot1000}
OPTIONAL,    -- Need M
    sl-PTRS-Config-r16                 SL-PTRS-Config-r16
OPTIONAL,    -- Need M
    sl-UE-SelectedConfigRP-r16         SL-UE-SelectedConfigRP-r16
OPTIONAL,    -- Need M
    sl-RxParametersNcell-r16           SEQUENCE {
        sl-TDD-Configuration-r16           TDD-UL-DL-ConfigCommon
OPTIONAL,    -- Need M
        sl-SyncConfigIndex-r16             INTEGER (0. .15)
    }
OPTIONAL,    -- Need M
    sl-ZoneConfigMCR-List-r16          SEQUENCE (SIZE (16) ) OF SL-ZoneConfigMCR-r16
OPTIONAL,    -- Need M
    sl-FilterCoefficient-r16           FilterCoefficient
OPTIONAL,    -- Need M
    sl-RB-Number-r16                   INTEGER (10. . 275)
OPTIONAL,    -- Need M
    sl-PreemptionEnable-r16            ENUMERATED {enabled, p11, p12, p13, p14, p15, p16, p17, p18}
```

FIG. 10 A

```
OPTIONAL,    -- Need R
     sl-PriorityThreshold-UL-URLLC-r16   INTEGER (1..9)
OPTIONAL,    -- Need M
     sl-PriorityThreshold-r16            INTEGER (1..9)
OPTIONAL,    -- Need M
     sl-X-Overhead-r16                   ENUMERATED {n0, n3, n6, n9}
OPTIONAL,    -- Need S
     sl-PowerControl-r16                 SL-PowerControl-r16
OPTIONAL,    -- Need M
     sl-TxPercentageList-r16             SL-TxPercentageList-r16
OPTIONAL,    -- Need M
     sl-MinMaxMCS-List-r16               SL-MinMaxMCS-List-r16
OPTIONAL,    -- Need M
     ...,
     [[
     sl-TimeResource-r16                 BIT STRING (SIZE (10..160))
OPTIONAL,    -- Need M
     ]]
}

sl-Interlece-Config ::=                 SEQUENCE {

     sl-numInterlaces                    INTEGER (0..M_max)
     sl-maxInterlaceAggregation          INTEGER (1..L_max_aggregation)
```

FIG. 10 B

DCI format 3_0 is used for scheduling of NR PSCCH and NR PSSCH in one cell.
The following information is transmitted by means of the DCI format 3_0 with CRC scrambled by SL-RNTI or SL-CS-RNTI:
- Resource pool index -$\lceil \log_2 I \rceil$ bits, where I is the number of resource pools for transmission configured by the higher layer parameter sl-TxPoolScheduling.
- Time gap - 3 bits determined by higher layer parameter sl-DCI-ToSL-Trans, as defined in clause 8.1.2.1 of [6, TS 38.214]
- HARQ process number - 4 bits as defined in clause 16.4 of [ 5, TS 38.213]
- New data indicator - 1 bit as defined in clause 16.4 of [5, TS 38.213]

- Lowest index of the subchannel allocation to the initial transmission - $\lceil \log_2 (N^{SL}_{subChannel}) \rceil$ bits as defined in clause 8.1.2.2 of [6, TS 38.214]
- SCI format 1-A fields according to clause 8.3.1.1:
- Frequency resource assignment.
- Time resource assignment.
- PSFCH-to-HARQ feedblack timing indicator - $\lceil \log_2 N_{fb\_timing} \rceil$ bits, where $N_{fb\_timing}$ is the number of entries in the higher layer parameter sl-PSFCH-ToPUCCH, as defined in clause 16.5 of [5, TS 38.213]

⋮

FIG. 12A

⋮

- PUCCH resource indicator - 3 bits as defined in clause 16.5 of [5, TS 38.213] .
- Configuration index - 0 bit if the UE is not configured to monitor DCI format 3_0 with CRC scrambled by SL-CS-RNTI; otherwise 3 bits as defined in clause 8.1.2 of [6, TS 38.214] . If the UE is configured to monitor DCI format 3_0 with CRC scrambled by SL-CS-RNTI, this field is reserved for DCI format 3_0 with CRC scrambled by SL-RNTI.
- Counter sidelink assignment index - 2 bits
- 2 bits as defined in clause 16.5.2 of [5, TS 38.213] if the UE is configured with pdsch-HARQ-ACK-Codebook = dynamic
- 2 bits as defined in clause 16.5.1 of [5, TS 38.213] if the UE is configured with pdsch-HARQ-ACK-Codebook = semi-static
- Padding bits, if required If multiple transmit resource pools are provided in sl-TxPoolScheduling, zeros shall be appended to the DCI format 3_0 until the payload size is equal to the size of a DCI format 3_0 given by a configuration of the transmit resource pool resulting in the largest number of information bits for DCI format 3_0.

If the UE is configured to monitor DCI format 3_1 and the number of information bits in DCI format 3_0 is less that the payload of DCI format 3_1, zeros shall be appended to DCI format 3_0 until the payload size equals that of DCI format 3_1.

FIG. 12B

SIDELINK, SL, INTERLACING CONFIGURATIONS

CROSS-REFERENCE TO RELATED APPLICATIONS

This application is a continuation of copending International Application No. PCT/EP2022/074325, filed Sep. 1, 2022, which is incorporated herein by reference in its entirety, and additionally claims priority from European Application No. 21194876.5, filed Sep. 3, 2021, which is also incorporated herein by reference in its entirety.

TECHNICAL FIELD

The present application relates to the field of wireless communication systems or networks, more specifically to an operation of a sidelink with an interlacing configuration.

BACKGROUND OF THE INVENTION

FIG. 1A and FIG. 1B collectively show a schematic representation of an example of a terrestrial wireless network 100 including, as is shown in FIG. 1A, the core network 102 and one or more radio access networks $RAN_1$, $RAN_2$, . . . . $RAN_N$. FIG. 1B is a schematic representation of an example of a radio access network $RAN_n$ that may include one or more base stations $gNB_1$ to $gNB_5$, each serving a specific area surrounding the base station schematically represented by respective cells $\mathbf{106}_1$ to $\mathbf{106}_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile or stationary devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1B shows an exemplary view of five cells, however, the $RAN_n$ may include more or less such cells, and $RAN_n$ may also include only one base station. FIG. 1B shows two users $UE_1$ and $UE_2$, also referred to as user device or user equipment, that are in cell $\mathbf{106}_2$ and that are served by base station $gNB_2$. Another user $UE_3$ is shown in cell $\mathbf{106}_4$ which is served by base station $gNB_4$. The arrows $\mathbf{108}_1$, $\mathbf{108}_2$ and $\mathbf{108}_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1B shows two further devices $\mathbf{110}_1$ and $\mathbf{110}_2$ in cell $\mathbf{106}_4$, like IoT devices, which may be stationary or mobile devices. The device $\mathbf{110}_1$ accesses the wireless communication system via the base station $gNB_4$ to receive and transmit data as schematically represented by arrow $\mathbf{112}_1$. The device $\mathbf{110}_2$ accesses the wireless communication system via the user $UE_3$ as is schematically represented by arrow $\mathbf{112}_2$. The respective base station $gNB_1$ to gNBs may be connected to the core network 102, e.g. via the S1 interface, via respective backhaul links $\mathbf{114}_1$ to $\mathbf{114}_5$, which are schematically represented in FIG. 1B by the arrows pointing to "core". The core network 102 may be connected to one or more external networks. The external network may be the Internet, or a private network, such as an Intranet or any other type of campus networks, e.g. a private WiFi communication system or a 4G or 5G mobile communication system. Further, some or all of the respective base station $gNB_1$ to $gNB_5$ may be connected, e.g. via the S1 or X2 interface or the XN interface in NR, with each other via respective backhaul links $\mathbf{116}_1$ to $\mathbf{116}_5$, which are schematically represented in FIG. 1B by the arrows pointing to "gNBs". A sidelink channel allows direct communication between UEs, also referred to as device-to-device, D2D, communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels, PDSCH, PUSCH, PSSCH, carrying user specific data, also referred to as downlink, uplink and sidelink payload data, the physical broadcast channel, PBCH, carrying for example a master information block, MIB, and one or more system information blocks, SIBs, one or more sidelink information blocks, SLIBs, if supported, the physical downlink, uplink and sidelink control channels, PDCCH, PUCCH, PSSCH, carrying for example the downlink control information, DCI, the uplink control information, UCI, and the sidelink control information, SCI, and physical sidelink feedback channels, PSFCH, carrying PC5 feedback responses. The sidelink interface may support a 2-stage SCI which refers to a first control region containing some parts of the SCI, also referred to as the $1^{st}$ stage SCI, and optionally, a second control region which contains a second part of control information, also referred to as the $2^{nd}$ stage SCI.

For the uplink, the physical channels may further include the physical random-access channel, PRACH or RACH, used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix, CP, length. A frame may also have a smaller number of OFDM symbols, e.g. when utilizing shortened transmission time intervals, sTTI, or a mini-slot/non-slot-based frame structure comprising just a few OFDM symbols.

The wireless communication system may be any single-tone or multicarrier system using frequency-division multiplexing, like the orthogonal frequency-division multiplexing, OFDM, system, the orthogonal frequency-division multiple access, OFDMA, system, or any other Inverse Fast Fourier Transform, IFFT, based signal with or without Cyclic Prefix, CP, e.g. Discrete Fourier Transform-spread-OFDM, DFT-s-OFDM. Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1A and FIG. 1B may be a heterogeneous network having distinct overlaid networks, e.g., a network of macro cells with each macro cell including a macro base station, like base station $gNB_1$ to $gNB_5$, and a network of small cell base stations, not shown in FIG. 1A and FIG. 1B, like femto or pico base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 1A and FIG. 1B, for example in accordance with the LTE-Advanced Pro standard or the 5G or NR, new radio, standard.

In mobile communication networks, for example in a network like that described above with reference to FIG. 1A and FIG. 1B, like a LTE or 5G/NR network, there may be UEs that communicate directly with each other over one or more sidelink, SL, channels, e.g., using the PC5/PC3 interface or WiFi direct. UEs that communicate directly with each other over the sidelink may include vehicles communicating directly with other vehicles, V2V communication, vehicles communicating with other entities of the wireless communication network, V2X communication, for example roadside units, RSUs, roadside entities, like traffic lights, traffic signs, or pedestrians. An RSU may have a functionality of a BS or of a UE, depending on the specific network configuration. Other UEs may not be vehicular related UEs and may comprise any of the above-mentioned devices. Such devices may also communicate directly with each other, D2D communication, using the SL channels. When considering two UEs directly communicating with each other over the sidelink, e.g., using the PC5/PC3 interface, one of the UEs may also be connected with a BS, and may relay information from the BS to the other UE via the sidelink interface and vice-versa. The relaying may be performed in the same frequency band, in-band-relay, or another frequency band, out-of-band relay, may be used. In the first case, communication on the Uu and on the sidelink may be decoupled using different time slots as in time division duplex, TDD, systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1A and FIG. 1B. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs directly communicating with each other are either not connected to a base station, although they may be physically within a cell of a wireless communication network, or some or all of the UEs directly communicating with each other are connected to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is the out-of-coverage scenario does not necessarily mean that the respective mode 2 UEs in NR or mode 4 UEs in LTE are outside of the coverage 200 of a base station, rather, it means that the respective mode 2 UEs in NR or mode 4 UEs in LTE are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the NR mode 1 or LTE mode 3 UEs 202, 204 also NR mode 2 or LTE mode 4 UEs 206, 208, 210 are present. In addition, FIG. 3, schematically illustrates an out of coverage UE using a relay to communicate with the network. For example, the UE 210 may communicate over the sidelink with UE 212 which, in turn, may be connected to the gNB via the Uu interface. Thus, UE 212 may relay information between the gNB and the UE 210

Although FIG. 2 and FIG. 3 illustrate vehicular UEs, it is noted that the described in-coverage and out-of-coverage scenarios also apply for non-vehicular UEs. In other words, any UE, like a hand-held device, communicating directly with another UE using SL channels may be in-coverage and out-of-coverage.

In a wireless communication system as described above with reference to FIG. 1A and FIG. 1B, FIG. 2 or FIG. 3, a UE communicating with the base station may communicate by use of so-called interlaces, i.e., a use of resources may be spread over different resource blocks according to a predefined regular scheme that provides for a spacing between resource blocks used by a device fur uplink or downlink, wherein adjacent an block may be allocated to a different node that implements a same but shifted scheme of resource blocks for its communication.

Starting from the known technology as described above, there may be a need for enhancements or improvements for a UE communicating over the sidelink.

SUMMARY

An embodiment may have a device having a wireless interface, the device being configured for communicating in a wireless communication network using sidelink communication over a sidelink; the sidelink being operated so as to comprise a plurality of subchannels, each subchannel having at least one physical resource block, PRB, —the sidelink being operated such that the plurality of subchannels form a plurality of interlaces, each interlace comprising a disjoint subset of the plurality of subchannels; —and wherein the subchannels or PRBs of an interlace are arranged in a discontinuous manner in the frequency range; wherein the device is to select at least one interlace for communication from the plurality of interlaces; wherein the device is to signal a reservation of one or more future resource(s) by the device, the reservation being associated with at least one interlace configuration for the future resource reservations.

Another embodiment may have a base station to operate a wireless communication network, wherein the base station is to allocate sidelink resources of a sidelink of the wireless communication network to a plurality of interlaces.

According to another embodiment, a method for operating a device comprising a wireless interface, the device being configured for communicating in a wireless communication network using sidelink communication over a sidelink; the sidelink being operated so as to comprise a plurality of subchannels, each subchannel having at least one physical resource block, PRB, —the sidelink being operated such that the plurality of subchannels form a plurality of interlaces, each interlace comprising a disjoint subset of the plurality of subchannels—and wherein the subchannels or PRBs of an interlace are arranged in a discontinuous manner in the frequency range; may have the steps of: selecting, with the device, at least one interlace for communication from the plurality of interlaces; and signaling a reservation of one or more future resource(s) by the device, the reservation being associated with at least one interlace configuration for the future resource reservations.

BRIEF DESCRIPTION OF THE DRAWINGS

Embodiments of the present invention are now described in further detail with reference to the accompanying drawings, in which:

FIG. 6A and FIG. 6B collectively show details about listen before talk in a wide-band operation;

FIG. 7 an example table illustrating a correlation between a resource indication value, a starting interlace index $m_0$ and a set of values L according to table 6.1.2.2.3-1 of TS 38.214 (V16.6.0);

FIG. 8 shows Table 4.4.4.6-1 of TS 38.211 (V16.6.0);

FIG. 10A and FIG. 10B collectively show an example resource pool configuration in pseudo-code according to an embodiment;

FIG. 12A and FIG. 12B collectively show an example interlace configuration in pseudo-code according to an embodiment;

DETAILED DESCRIPTION OF THE INVENTION

Embodiments of the present invention are now described in more detail with reference to the accompanying drawings in which the same or similar elements have the same reference signs assigned.

In the wireless communication system or network, like the one described above with reference to FIG. 1A and FIG. 1B, FIG. 2 or FIG. 3, a sidelink communication among the respective user devices may be implemented, for example, a vehicle-to-vehicle communication, V2V, a vehicle-to-anything communication, V2X, or any device-to-device communication, D2D, among any other use devices, for example, those mentioned above.

The initial vehicle-to-everything (V2X) specification was included in Release 14 of the 3GPP standard. The scheduling and assignment of resources have been modified according to the V2X requirements, while the original device-to-device (D2D) communication standard has been used as the basis of the design. Release 15 of the LTE V2X standards (also known as enhanced V2X or eV2X) was completed in June 2018, and Release 16, the first release of 5G NR V2X, was completed in March 2020. Release 17 focuses on sidelink enhancements, with emphasis on power saving, enhanced reliability and reduced latency, to cater to not only vehicular communications, but also public safety and commercial use cases.

Figure 1A:
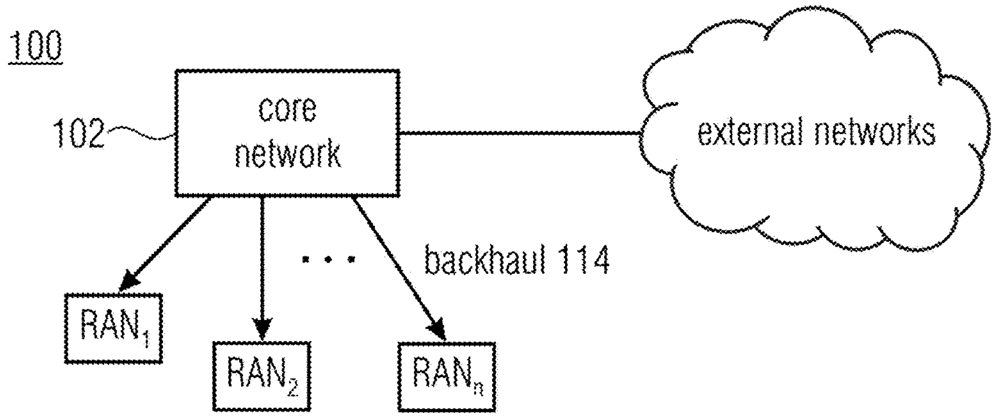
FIG. 1A and FIG. 1B collectively show a schematic representation of an example of a wireless communication system.
Figure 1B:
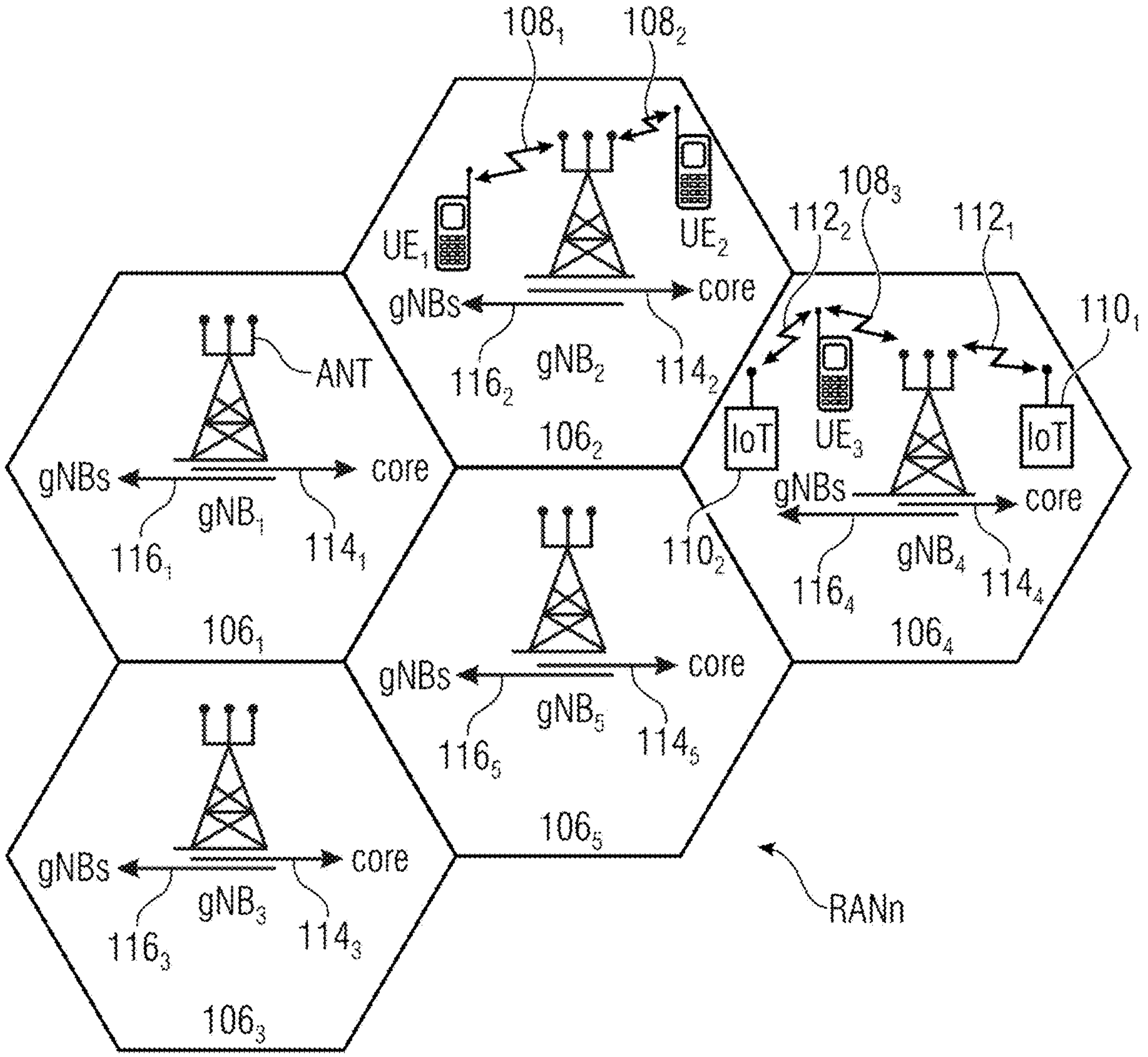
Figure 2:
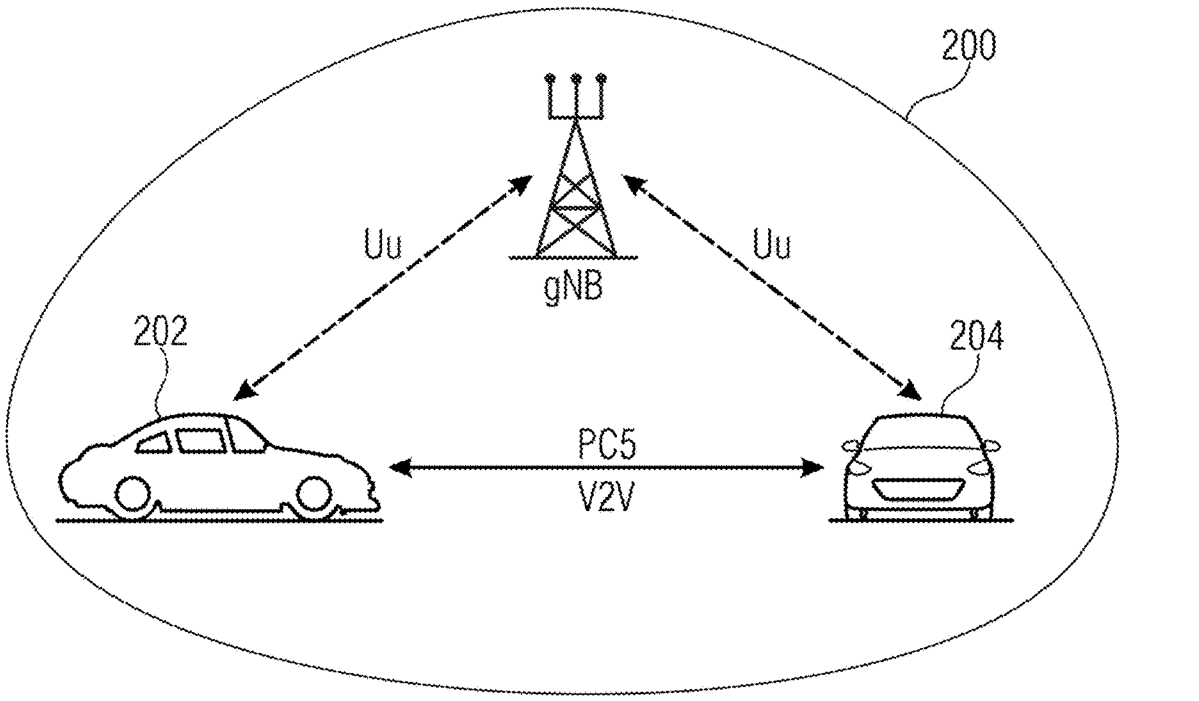
FIG. 2 is a schematic representation of an in-coverage scenario in which two UEs directly communicating with each other are both connected to a base station.
Figure 3:
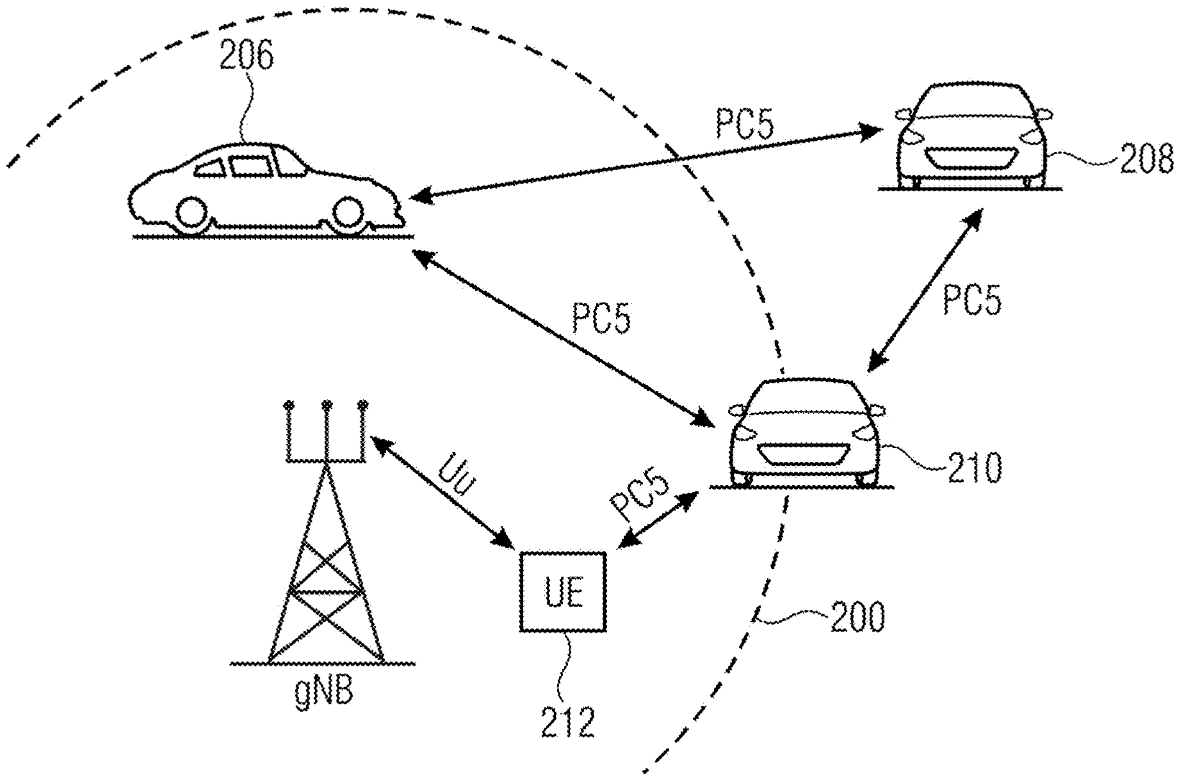
FIG. 3 is a schematic representation of an out-of-coverage scenario in which the UEs directly communicate with each other.
Figure 4:
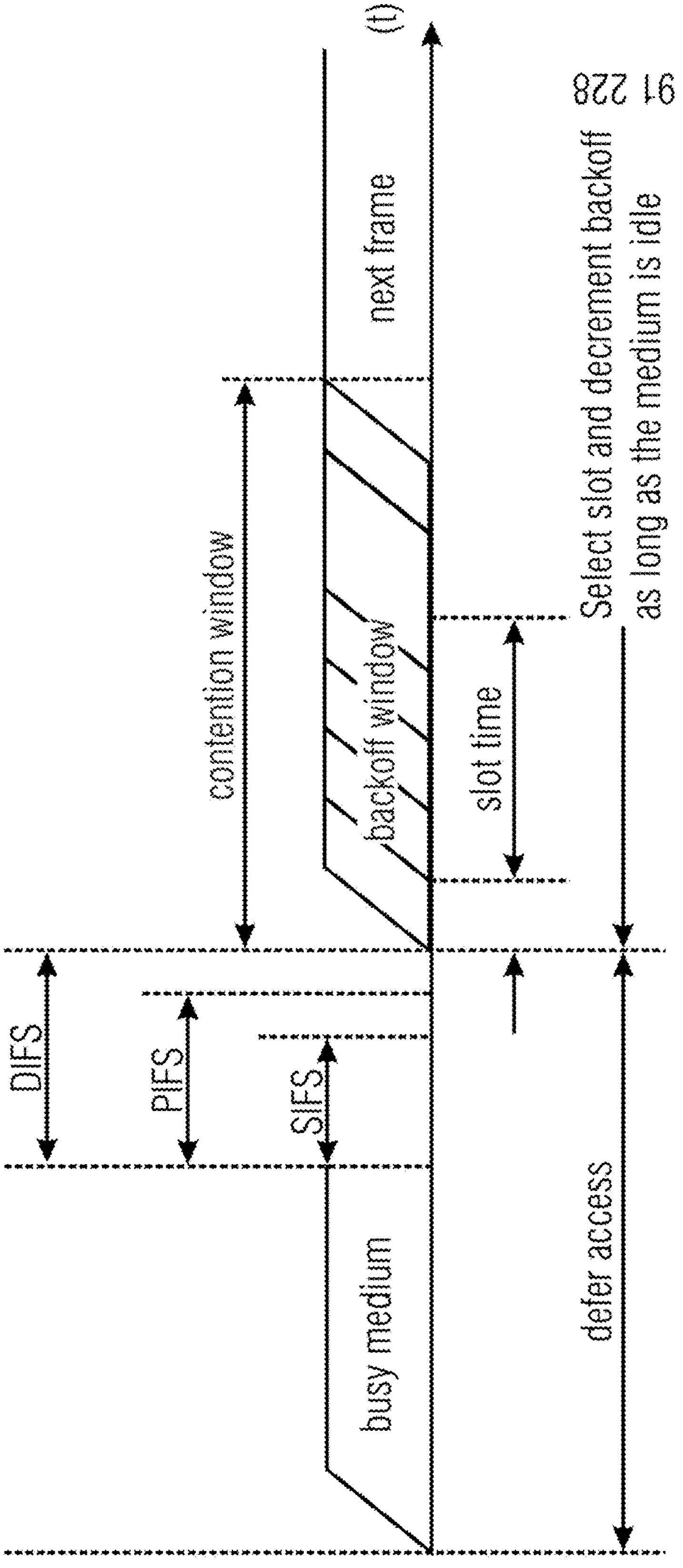
FIG. 4 shows a schematic illustration of a known DFS (dynamic frequency search) as used by the CSMA/CA (Carrier Sense Multiple Access/Collision Detection algorithm of IEEE 802.11 systems.
Figure 5:
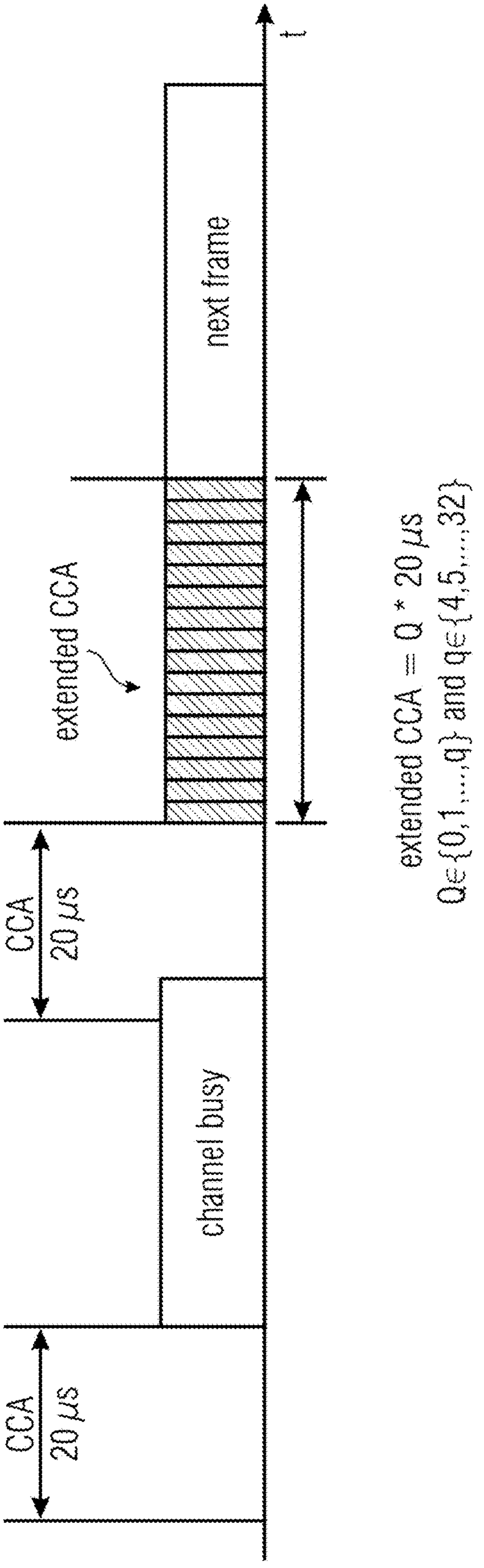
FIG. 5 shows a schematic representation of rules for Load Based Equipment (LBE) in Europe and an implementation of a Clear Channel Assessment (CCA) used in 802.11 Medium Access Control (MAC)

IEEE 802.11 systems send frames using the Distributed Coordination Function (DCF). This is composed of interframe spaces and a random backoff (contention window) as depicted in FIG. 4 showing a schematic illustration of the DFS. There are shown Interframe spaces, a backoff window and a contention window as used by the CSMA/CA (Carrier Sense Multiple Access/Collision Detection) algorithm of IEEE 802.11 systems FIG. 5 shows a schematic representation of rules for Load Based Equipment (LBE) in Europe and an implementation of a Clear Channel Assessment (CCA) used in 802.11 Medium Access Control (MAC).

In the bands with potential IEEE 802.11 coexistence, such as the 5 GHZ and potentially also the 6 GHz bands, NR-U only supports bandwidths that are an integer multiple of 20 MHz due to regulatory requirements. Each of these 20 MHz bandwidth channels is designated as subband. The splitting into subbands is performed to minimize interference with IEEE 802.11 systems, which might operate in the same bands with the same nominal bandwidth channels (i.e., 20 MHz). In unlicensed frequency bands other than the 5 GHZ band, e.g. 24 GHZ, the subband size and the nominal frequency might differ. In wideband operation (e.g., >20 MHz for the 5 GHz operational unlicensed band), the gNB and the UE have to perform listen-before-talk (LBT) separately on each subband. Once the LBT results are available from each subband, the devices (gNB in DL and UE in UL) are only allowed to transmit on the won subbands.

FIG. 6A and FIG. 6B collectively show details about LBT in a wide-band operation, e.g., a wideband operation for NR-U. The number of 20 MHz subbands in the 5 GHz unlicensed band is identified to be e.g. 4 (i.e. 80 MHz). The number of subbands in other unlicensed frequency bands may differ.

The LBT schemes in 3GPP RAN are classified into 4 different categories (CATs):

| | |
|---|---|
| 1. Category 1: | No LBT |
| 2. Category 2: | LBT without random back-off |
| 3. Category 3: | LBT with random back-off with fixed size of contention window |
| 4. Category 4: | LBT with random back-off with variable size of contention window |

For initiating a Channel Occupancy Time (COT) within a supported/configured Bandwidth Part (BWP), the gNB and UE has to perform a CAT-4 LBT (with random backoff and variable contention window size (CWS)). Within a gNB-initiated COT, the UEs use a CAT-2 LBT (without random backoff and fixed CWS) procedure to transmit a physical uplink control channel, PUCCH, or physical uplink shared channel, PUSCH. Similarly, for a UE initiated COT using CAT-4 LBT, it is discussed that the gNB may use CAT-2 LBT for transmitting within a UE-initiated COT. In this case, the UE may indicate the maximum time the gNB is-supposed to transmit within its COT.

Interlaces

TS 38.214 relates to an uplink resource allocation type 2. In uplink resource allocation of type 2, the resource block assignment information defined in [TS 38.212] indicates to a UE a set of up to M interlace indices, and for DCI 0_0 monitored in a UE-specific search space and DCI 0_1 a set of up to contiguous RB sets, where M and interlace indexing are defined in Clause 4.4.4.6 in [TS 38.211]. Within the active UL BWP, the assigned physical resource block is mapped to virtual resource block For DCI 0_0 monitored in a UE-specific search space and DCI 0_1, the UE shall determine the resource allocation in frequency domain as an intersection of the resource blocks of the indicated interlaces and the union of the indicated set of RB sets and intra-cell guard bands defined in Clause 7 of TS 38.214 between the indicated RB sets, if any.

For DCI 0_0 monitored in a common search space, the UE shall determine the resource allocation in frequency domain as an intersection of the resource blocks of the indicated interlaces and a single uplink RB set of the active UL BWP. For DCI 0_0 monitored in a CSS with CRC scrambled by an RNTI other than TC-RNTI, the uplink RB set is the lowest indexed one amongst uplink RB set(s) that intersects the lowest-indexed CCE of the PDCCH in which the UE detects the DCI 0_0 in the active downlink BWP. If there is no intersection, the uplink RB set is RB set 0 in the active uplink. BWP. For DCI 0_0 with CRC scrambled by TC-RNTI, the uplink RB set is the same one in which the UE transmits the PRACH associated with the RAR UL grant, in which case the UE assumes that the uplink RB set is defined as when the UE is not configured with intraCellGuardBand-sUL-List (see Clause 7 of TS 38.214).

For μ=0, the X=6 MSBs of the resource block assignment information indicates to a UE a set of allocated interlace indices, where the indication consists of a resource indication value (RIV). For the resource indication value corresponds to the starting interlace index m0 and the number of contiguous interlace indices L (L≥1). The resource indication value is defined by:

```
if (L − 1) ≤ ⌊M/2⌋ then
  RIV = M(L − 1) + m0
else
  RIV = M(M − L + 1) + (M − 1− m0)
```

For RIV≥M(M+1)/2, the resource indication value corresponds to the starting interlace index $m_0$ and the set of values L according to the table presented in FIG. 7 showing table 6.1.2.2.3-1 of TS 38.214 (V16.6.0).

For μ=1, the X=5 MSBs of the resource block assignment information comprise a bitmap indicating the interlaces that are allocated to the scheduled UE. The bitmap is of size M bits with one bitmap bit per interlace such that each interlace is addressable, where M and interlace indexing is defined in Clause 4.4.4.6 in [TS 38.211]. The order of interlace bitmap is such that interlace 0 to interlace are mapped from MSB to LSB of the bitmap. An interlace is allocated to the UE if the corresponding bit value in the bitmap is 1; otherwise the interlace is not allocated to the UE.

Interlaced Resource Blocks

Multiple interlaces of resource blocks are defined where interlace m∈[0, 1, . . . , M−1] consists of common resource blocks [m, M+m, 2M+m, 3M+m . . . ], with M being the number of interlaces given by Table 4.4.4.6-1 of TS 38.211 (V16.6.0) represented in FIG. 8. The relation between the interlaced resource block $$n_{IRB,m}^{\mu} \in \{0, 1, \ldots\}$$

in bandwidth part i and interlace m and the common resource block $$n_{CRB}^{\mu}$$

is given by $$n_{CRB}^{\mu} = M n_{IRB,m}^{\mu} + N_{BWP,i}^{start,\mu} + \left(\left(m - N_{BWP,i}^{start,\mu}\right) \bmod M\right)$$

where $$N_{BWP,i}^{start,\mu}$$

is the common resource block where bandwidth part starts relative to common resource block 0. When there is no risk for confusion the index u may be dropped. The UE expects that the number of common resource blocks in an interlace contained within bandwidth part i is no less than 10

Embodiments are based on the finding that such a strategy of using interlaces may also be beneficial for the sidelink, SL, and provide for solutions for applying interlaced transmissions to SL. Embodiments provide for adaptions and enhancements to enable the use of interlaces for SL communication on unlicensed bands.

Structure and Configuration of Interlaces

Figure 9A:
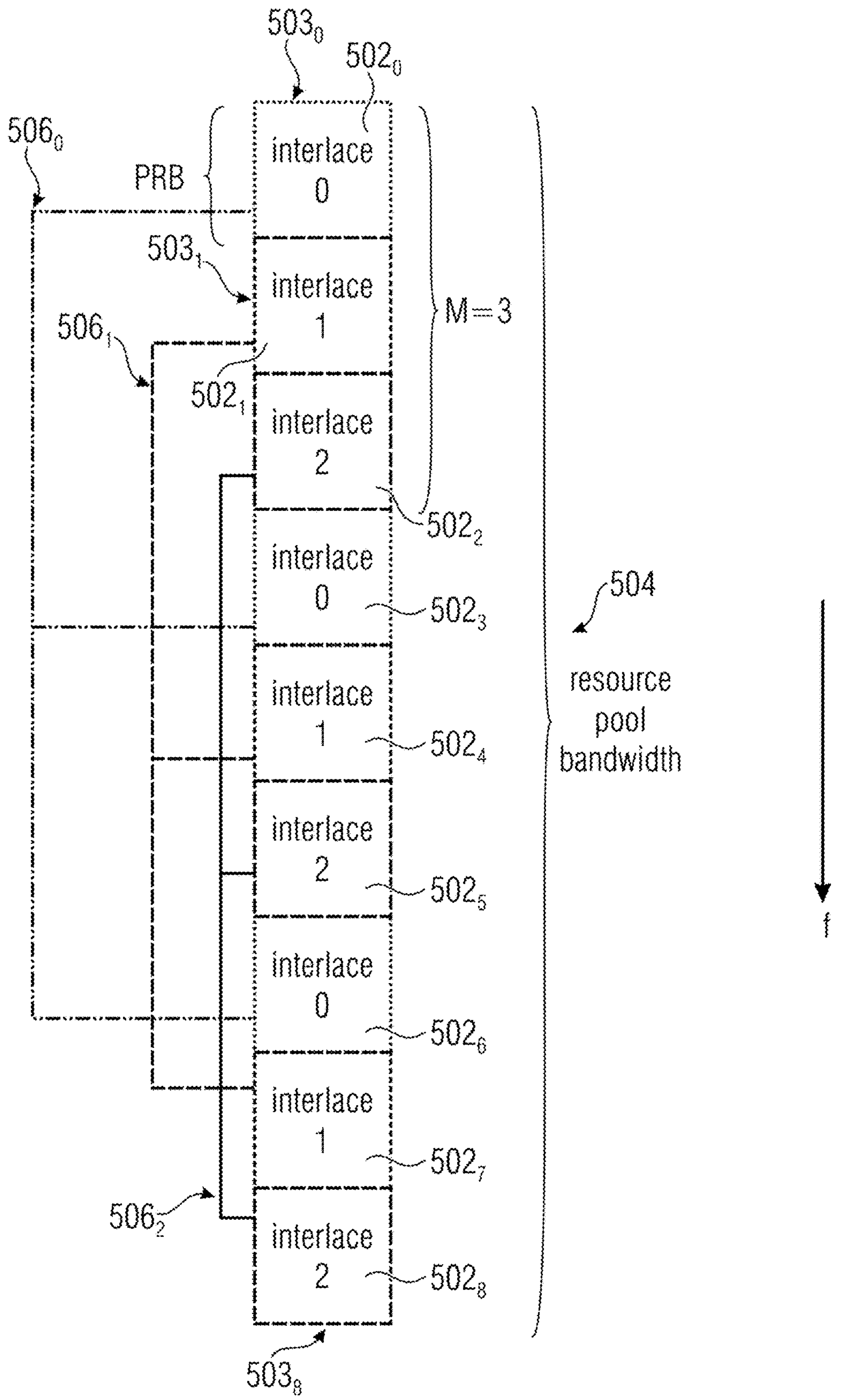
FIG. 9A shows an example illustration of a plurality of subchannels each comprising a single physical resource block are grouped to interlaces according to an embodiment.

FIG. 9A shows an example illustration of a plurality of physical resource blocks, PRBs, 502$_0$ to 502$_8$, wherein the number of 9 PRBs is selected as an example only. Any other number PRBs may be used within a channel or subchannel in a slot, the configuration may be static or varying and may be a matter on the network configuration. In the illustrated configuration of FIG. 9A each PRB 502$_0$ to 502$_8$ forms a subchannel 503$_0$ to 503$_8$, the subchannels 503$_0$ to 503$_8$ thus comprising a single PRB only. As will be described in detail in connection with FIG. 9B, a higher number of PRBs may alternatively form a subchannel.

The PRBs 502$_0$ to 502$_8$ may occupy at least a part of a resource pool bandwidth 504, wherein said occupation may be continuous or discontinuous. The PRBs 502$_0$ to 502$_8$ may be spread over the bandwidth 504. The PRBs 502, to 502$_8$ may be grouped into interlaces 506$_0$ to 506$_2$ such that, for example, PRBs 502$_0$, 502$_3$ and 502$_6$ may be grouped to interlace 506$_0$, PRBs 502$_1$, 502$_4$ and 502$_7$ may be grouped to interlace 506$_1$ and PRBs 502$_2$, 502$_5$ and 502$_8$ may be grouped to interlace 506$_3$. The arrangement of the interlaces may be according to a comb-like structure, the comb-like structures of the different interlaces being similar or even identical on the one hand and shifted with respect to each other on the other hand. The subsets 502$_0$, 502$_3$ and 502$_6$; 502$_1$, 502$_4$ and 502$_7$; and 502$_2$, 502$_5$ and 502$_8$ may be disjoint such that a specific PRB 502 is, at an instance of time, a member of a single interlace only, which does not preclude to change the configuration between different instances of time.

A parameter M may indicate a number of interlaces into which the plurality of PRBs 502 are grouped and comprises, in the illustrated embodiment, a value of 3. Any other value greater than 1 may be selected which may lead to a number of PRBs 502 being different from 9 and/or to PRBs unassigned to an interlace.

Figure 9B:
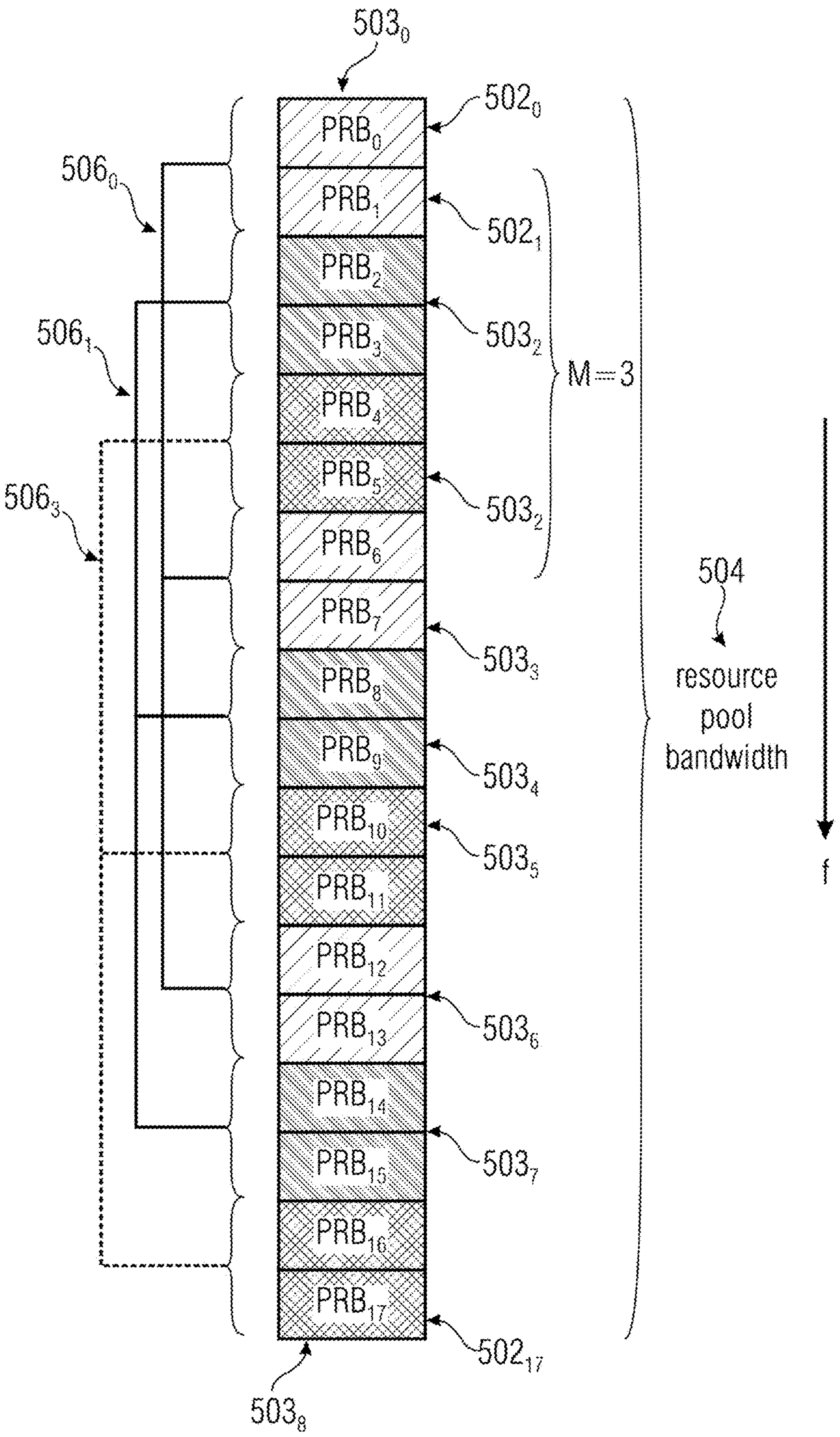
FIG. 9B shows an example illustration of an interlace configuration in which the subchannels comprise more than one physical resource block according to an embodiment.

FIG. 9B shows another configuration of PRBs 502$_0$ to 502$_{17}$. In the configuration of FIG. 9B each subchannel 503$_0$ to 503$_8$ may comprise a number of two PRBs arranged adjacent in the frequency domain. When compared to FIG. 9A, a higher number of PRBs is grouped to a same configuration of interlaces, wherein, as an alternative any other configuration may be obtained. Advantageously, each subchannel comprises a same number of PRBs. For example, a subchannel 503 may comprise a number of 3 or more PRBs, a number of 3 PRBs arriving (considering the example number of 18 available PRBs) at 6 subchannels that might be divided into 2 interlaces 506 having three subchannels 503 each or into 3 interlaces 506 having 2 subchannels 503 each.

That is, a number of PRBs in the resource pool bandwidth, a number thereof forming a subchannel, a number of subchannels forming an interlace and a number of interlaces may be subject of configuration of a wireless communication network and may be static or dynamic. A respective information may be known by a device or may be transmitted to the device.

Currently in NR-U, i.e., outside the sidelink, the UE is configured with the parameter M and an UL BWP containing the set of physical resource blocks, PRBs, B where M is the number of interlaces. To determine the PRBs or subchannels which are associated with an interlace m, the UE first determines the set of PRBs or subchannels P: ={m, m+M, m+2M, m+3M, . . . } and performs an intersection operation I with the UL BWP: I=P∩B. That is, P: ={m, m+M, m+2M, m+3M, . . . } may relate to subchannels as well, in particular by comprising one or more PRBs.

Hence, a straightforward way to implement interlaces on the SL would be to perform the intersection with the SL BWP instead of the UL BWP.

However, the inventors have found that a resource pool, RP, may not span the whole SL BWP. Alternatively or in addition, multiple RPs may be operated independently at a same time. Hence, embodiments propose that the intersection is performed with the PRBs or subchannels of the SL RP instead of the BWP. For example, B may be substituted in the intersection I=P n B with the PRBs or subchannels of the SL RP, e.g., the plurality of PRBs or subchannels 502$_0$ to 502$_8$.

Alternatively the intersection can be applied on a set of LBT sub-channels. This set can be determined by preconfiguration, grant (control signaling) or sensing procedure.

Furthermore, different interlace configurations may be supported per RP. Hence, the parameter M may be signaled in the RP configuration.

Interlace Reservations

A UE transmitting on a SL pool can reserve up to, e.g., two further future transmissions by indicating these in the physical sidelink control channel, PSCCH. Another UE sensing the channel can consider these future resources in its sensing procedure in order to determine a set of candidate resources for a transmission. Embodiments provide a device such as a UE that can also reserve interlaces with a reservation SCI.

Example 1: The SCI indicates a separate interlace configuration (e.g., comprising or consisting of $m_0$ and L) for each reservation. This can be done by indicating one RIV value per reservation.

Alternatively or in addition,

Example 2: The further reservations use the same interlace configuration ($m_0$ and L) as the PSSCH in the same slot in which the reservation is transmitted. Hence, the SCI has to contain only a single RIV which is applied to the current slot as well as to the future reservations.

Those examples, can be combined, for example, to operate differently at different time instances or operating modes, and/or to aggregate only some reservations according to Example 1 whilst adding to this aggregation individual reservations according to Example 2.

Sensing for Interlaces

A UE performing a sensing operation decodes the first stage SCI, e.g., on PSCCH, in order to determine occupied resources by future reservations. Embodiments provide a UE that considers unused interlaces as free resources during the sensing procedure, i.e. even if a reservation shows a transmission in slot n occupying the slot, the UE determines from the RIV parameter which interlaces are actually used and considers other unoccupied interlaces as potential candidates for its transmission.

Physical Channel Mapping for Interlaces.

According to embodiments, PSSCH and PSCCH are spread into the interlaces, i.e., they are used or the devices are operated accordingly. To achieve frequency diversity, the PSCCH (first stage SCI) may be spread over all PRBs or subchannels of a single interlace, e.g. the interlace with the lowest or highest index. The first stage SCI can indicate on which interlace indexes the PSSCH is located.

This information is used in embodiments to decode the second (2nd) stage SCI and the data portion.

A UE may use $m_0$ to $m_0+L-1$ interlaces for a transmission. The PSCCH is always located on a defined interlace index e.g. $m_0$, the first index. The remaining interlace indices which are indicated in the SCI may contain a copy of the PSCCH of the defined interlace index or may be free of any PSCCH region.

Control signaling DCI:

Size of transmission: How many interlaces the current transmission is spread on RIV Control signaling SCI:

Reservation: time (TRIV) and interlaces of future transmissions if frequency can change (adapt FRIV: m0_1 and m0_2)

Size of grant: L number of interlaces (RIV with fixed $m_0$)

Resource Pool Configuration

In order to transmit and receive on interlaces, the interlaces need to be configured. According to embodiments, this is done in the resource pool configuration.

FIG. 10A and FIG. 10B collectively show an example resource pool configuration in pseudo-code that has an sl-Interlace-Config present, if interlacing is used in the pool. The sl-Interlace-Config provides the number of interlaces M and optionally the maximal number L_max a UE can aggregate for one transmission. The value of L_max may be changed in the network, e.g., with a granularity in time of hours, minutes or seconds but may also remain constant. If no L_max is defined, then M provides a natural limit of interlaces that a UE may aggregate.

The parameter sl-maxInterlaceAggregation can also be an implemented as an enum-field or similar which may allow, according to embodiments to allow only certain values, e.g. ENUMERATED {disabled, I1, I2, I4, I8}.

According to an embodiment that may be implemented in addition or as an alternative, the RP configuration uses a sl-allowedInterlaceAggregationList-field to indicate one or more values for L that are allowed, e.g. SEQUENCE (SIZE(1 . . . M)) OF INTEGER (1 . . . L_max/M) or SEQUENCE (SIZE(1 . . . M)) OF ENUMERATED {I1, I2, I4, I8}.

Additionally, in case only a subset of L values are allowed, the smallest possible L value determines the granularity of $m_0$, e.g. $m_0$ may be a multiple of the smallest possible L value.

Furthermore, if the UE determines a granularity of the $m_0$ value which is larger than 1, the UE monitors PSCCH (first stage SCI) only the interlaces where a UE would be allowed to start its first interlace index $m_0$.

In an embodiment, the formula to calculate a IRIV/FRIV is adapted such that the granularity of $m_0$ is taken into account in order to save bits.

Figure 11:
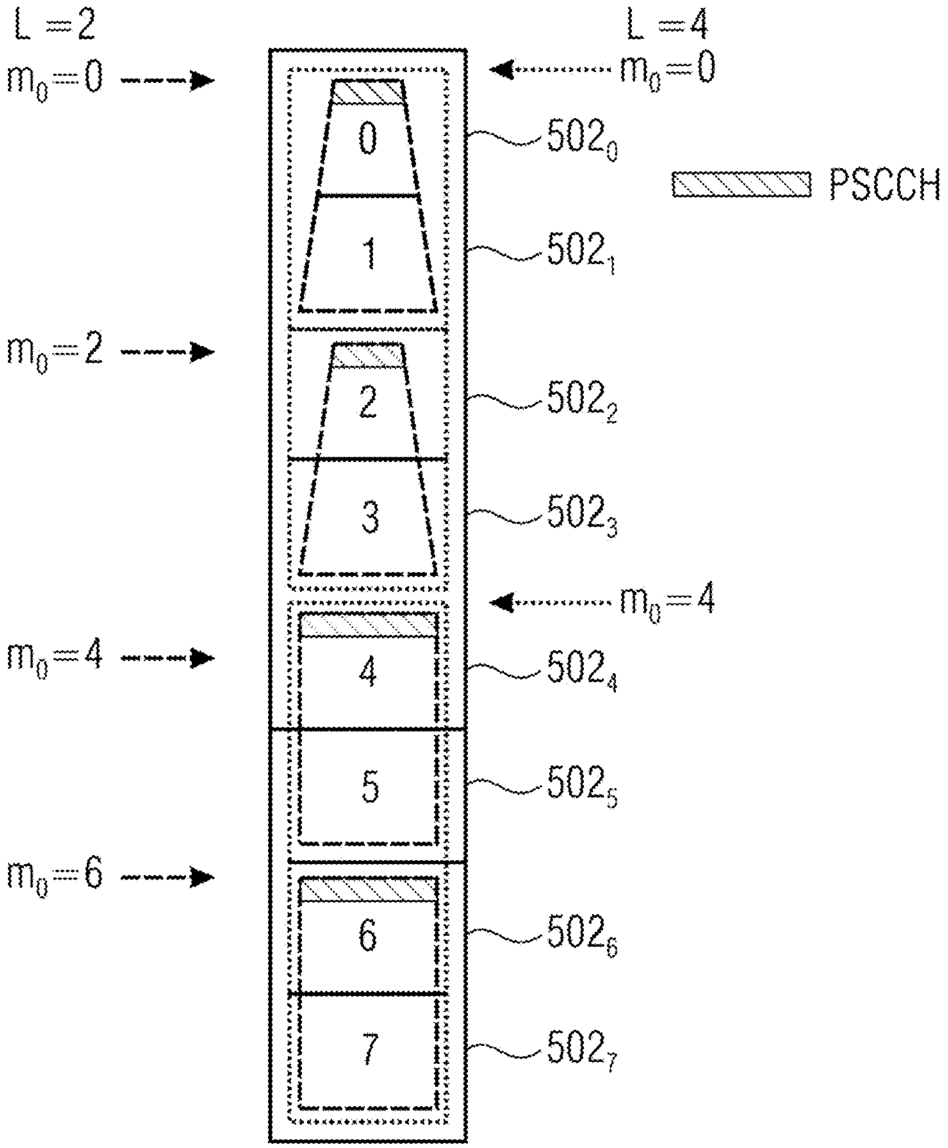
FIG. 11 shows a schematic representation of an interlace configuration according to an embodiment in which a list of allowed values for aggregating resources is set to comprise the value of 2 and the value of 4.

FIG. 11 shows a schematic representation of an interlace configuration in which the list of allowed values for L is set to comprise the value of 2 and the value of 4, e.g., represented as sl-AllowedInterlaceAggregationList={2,4}. This may lead to a restricted number of $m_0$ starting positions and a reduced PSCCH search space.

For example, when allowing to aggregate four PRBs 502, i.e., L=4, within the number of 8 PRBs $\mathbf{502}_0$ to $\mathbf{502}_7$ only PRBs $\mathbf{502}_0$ and $\mathbf{502}_4$ may form a suitable starting point when trying to using all PRBs 502 in the network, For example, when allowing to aggregate two PRBs 502, i.e., L=2, within the number of 8 PRBs $\mathbf{502}_0$ to $\mathbf{502}_7$ an increased number of 4 starting points at PRBs $\mathbf{502}_0$, $\mathbf{502}_2$, $\mathbf{502}_4$ and $\mathbf{502}_6$ may form a suitable starting point when trying to using all PRBs 502 in the network, At the respective possible starting points, the PSCCH may be located, i.e., PSCCH at PRBs $\mathbf{502}_2$ and $\mathbf{502}_6$ may be absent in case only L=4 is possible for sl-AllowedInterlace-AggregationList={4}

It is to be noted that

As indicated in FIG. 11, the possibilities for $m_0$ being obtained by allowing only 2 and 4 being valid values for L may result in PRBs 0, 2, 4 and 6 (L=2) to be searched evaluated for the PSCCH or even only PRBs 0 and 4 (L=4).

DCI Signalling

To signal a grant in a RP with interlaces the base station needs to indicate the one or more interlaces L to be used by the SL-UE. For this, according to an embodiment, a new DCI format can be used or an existing DCI format can be extended to include one or more of the following:

$m_0$ starting interlace of the grant

L number of interlaces to be used for the grant

This information can be sent instead of the lowest subchannel index used for allocation. Alternatively or in addition, the subchannel allocation field can be reinterpreted to indicate the lowest interlace L of the transmission grant.

An example is given in FIG. 12A and FIG. 12B showing an example configuration in pseudo-code.

SCI Signalling

When interlaces are used the first stage SCI may indicate the PSSCH location. To indicate this, the frequency resource assignment may be changed to indicate interlaces used.

The starting interlace $$m_{interlace,0}^{start}$$

of the first interface may be determined according to clause 8.1.2.2 of TS 38.214. The number of contiguously allocated interlaces for each of the for each of the $L_{interlace} \geq 1$ resources and the starting indexes of resources indicated by the received SCI, except the resource in the slot where SCI was received, are determined from "and the starting" which is equal to a interlace indexes of resources indicated by the received SCI, except the resource in the slot where SCI was received, are determined from "Interlace resource assignment" which is equal to a interlace/frequency RIV (IRIV or FRIV) where.

If *sl-MaxNumPerReserve* is 2 then $$IRIV = m_{interlace,1}^{start} + \sum_{i=1}^{L_{interlace}-1} \left(M_{interlace}^{SL} + 1 - i\right)$$

If *sl*-Max*NumPerReserve* is 3 then $$IRIV = m_{interlace,1}^{start} + m_{interlace,2}^{start} \cdot \left(M_{interlace}^{SL} + 1 - L_{interlace}\right) + \sum_{i=1}^{L_{interlace}-1} \left(M_{interlace}^{SL} + 1 - i\right)^2$$

where $$m_{interlace,1}^{start}$$

denotes the starting interlace index for the second resource;

$$m_{interlace,2}^{start}$$

denotes the starting interlace index for the third resource $$M_{interlace}^{SL}$$

is the number of interlaces in a resource pool provided according to the higher layer parameter sl-NumInterlaces As an example alternative, $$M_{interlace}^{SL} := \min(M, \text{L\_max}),$$

where M is the number of interlaces configured, e.g. in the RP config, and L_max is the maximum number of contiguous interlaces that a UE is allowed to use.

A device according to an embodiment comprises a wireless interface, the device being configured for communicating in a wireless communication network using sidelink communication over a sidelink. The sidelink is operated so as to comprise a plurality of subchannels, each subchannel having at least one physical resource block, PRB, the sidelink being operated such that the plurality of subchannels form a plurality of interlaces, each interlace comprising a disjoint subset of the plurality of subchannels. The subchannels or PRBs of an interlace are arranged in a discontinuous manner in the frequency range. The device is to select, e.g., for transmission, TX, or reception, RX at least one interlace for communication from the plurality of interlaces and for communicating on the sidelink, e.g., using the at selected subchannel, which may comprise to not select a different subchannel/interlace, i.e., not all PRBs are selected.

The plurality of subchannels may be spread over a carrier bandwidth. Alternatively or in addition, the disjoint subsets may be arranged between a minimum frequency and a maximum frequency of the interlace; wherein the plurality of subchannels overlaps between minimum frequencies and maximum frequencies of the subchannel According to an embodiment, the subchannels or PRBs used for a transmission or reception are determined by an intersection of the resources associated with the selected interlace and the associated SL resource pool.

According to an embodiment, the sidelink is a sidelink organized by the wireless communication network, e.g., in mode 1, or is organized partially by the device, e.g., in mode 2.

According to an embodiment, the device is to transmit an interlaced transmission in the sidelink using the wireless interface by accessing the selected interlace; and/or According to an embodiment, the device is to receive an interlaced transmission in the sidelink using the wireless interface by decoding resources associated to the selected interlace.

According to an embodiment, the subchannels of different interlaces are arranged with a same periodicity in a frequency domain.

According to an embodiment, the plurality of subchannels is representable as an enumerated sequence of subchannels being sequentially arranged in a frequency domain; wherein each of the plurality of interlaces is based on an intersection of a set of subchannels, the set being based on a starting subchannel [$m_0$] of the enumerated sequence and a periodicity (M) of subchannels into which the plurality is grouped on the one hand which may referred to as, for example, the parameter P; and a resource pool of the sidelink on the other hand.

Figure 14:
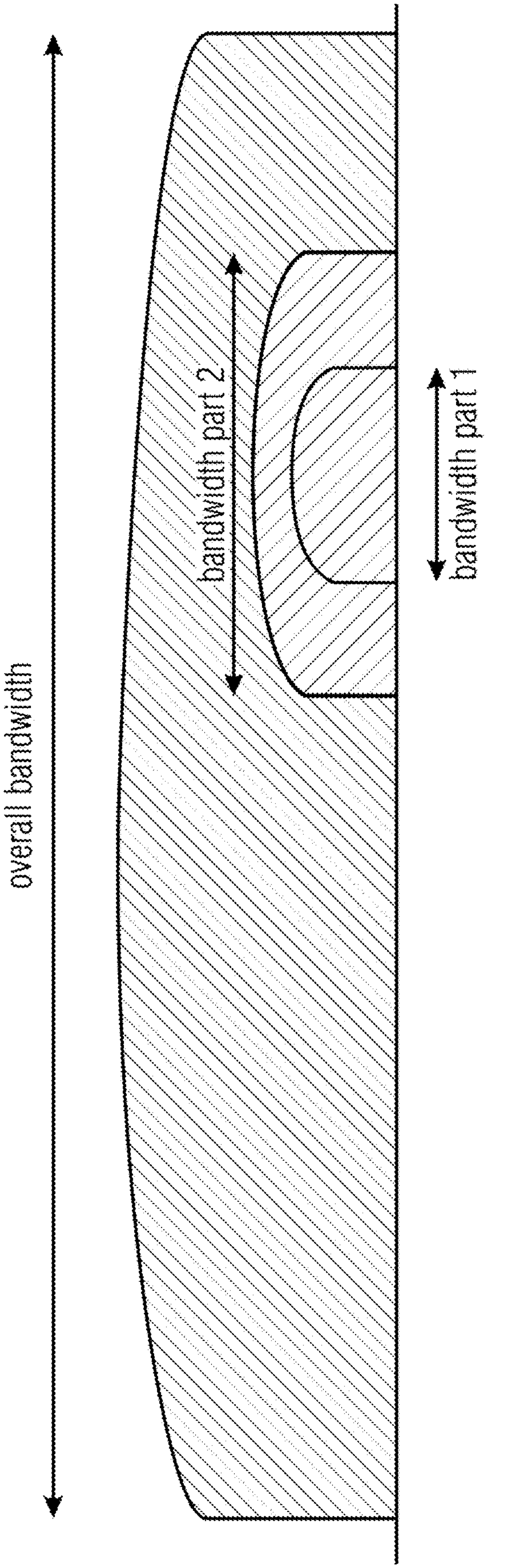
FIG. 14 shows a bandwidth part, BWP, being a subset of frequency resources across the entire overall bandwidth.
Figure 15:
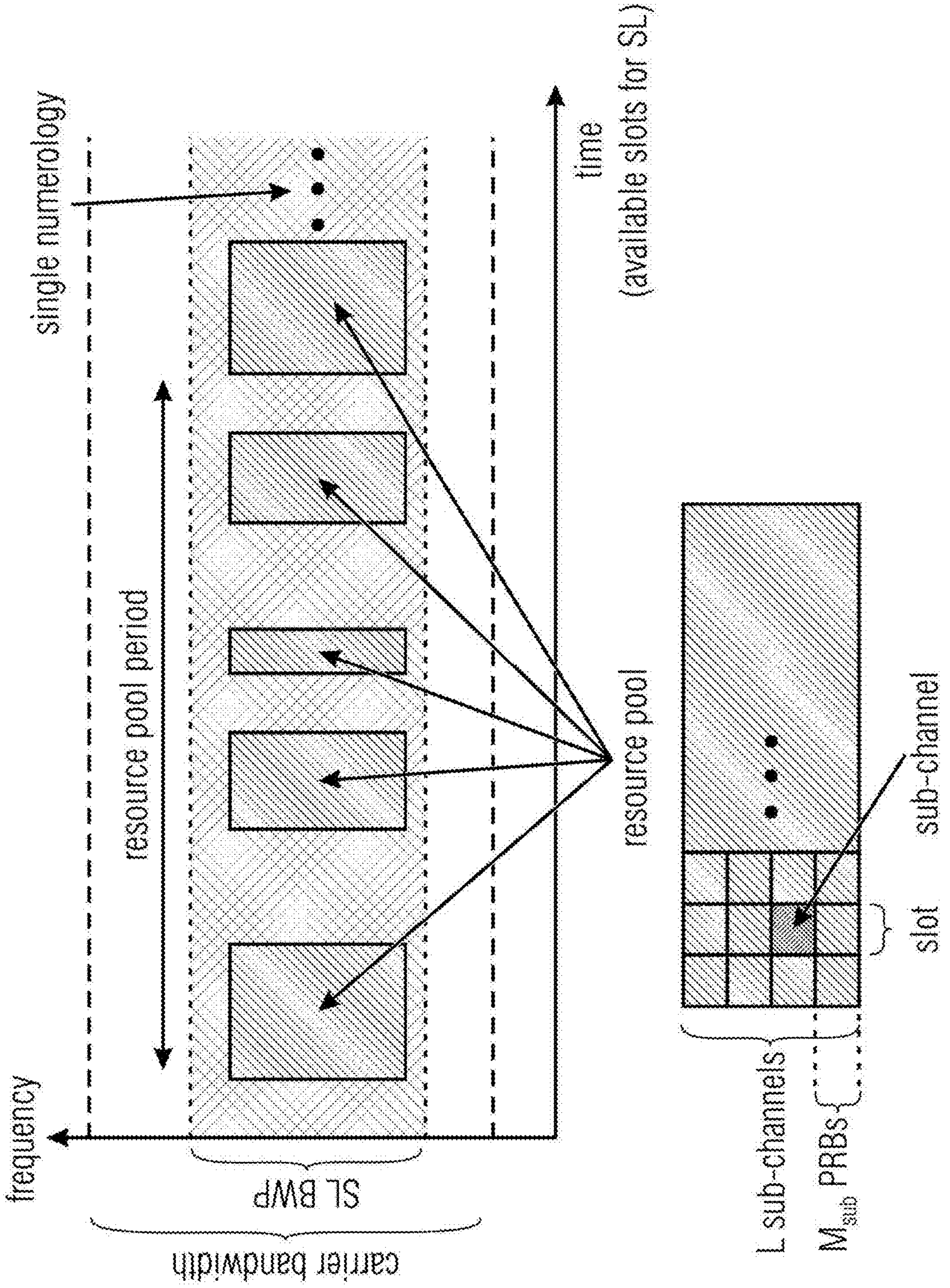
FIG. 15 shows a schematic representation of a resource pool.

For example, when referring to FIG. 14, there is shown a BWP is a subset of frequency resources across the entire overall bandwidth. A UE may configured with one active SL BWP, with this BWP containing one or more resource pools within a SL BWP As shown FIG. 15 a resource pool may be defined in time by a pattern indicating the time slots that belong to a resource pool, and in frequency by the number of sub channels. Each sub channel consists of contiguous RBs that are defined by pre-configuration.

Figure 16:
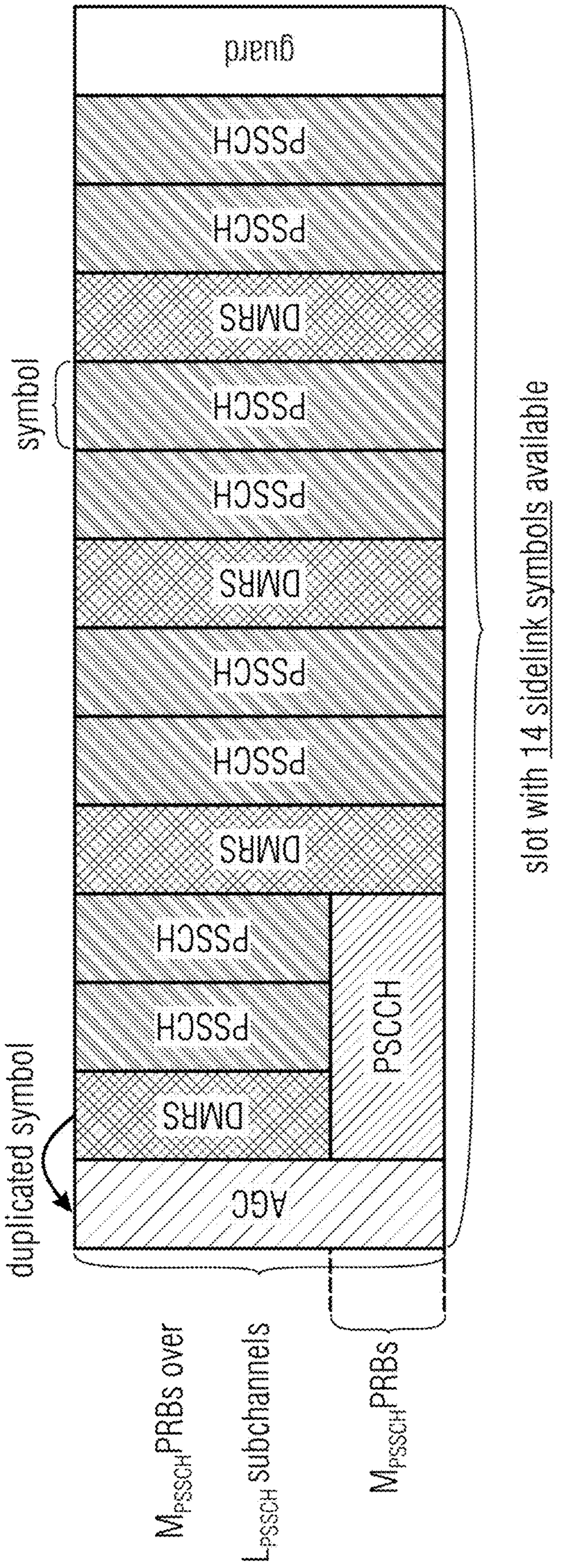
FIG. 16 shows ab example slot configuration according to an embodiment.

As shown in FIG. 16, for example, within the slots that can be used for PSSCH transmission, there can be from 7 to 14 of the symbols reserved for sidelink operation, of which PSSCH can be transmitted in 5 to 12 symbols. The remaining sidelink symbols transmit some or all of PSCCH, PSFCH, AGC symbol(s), guard symbol(s).

According to an embodiment, the device is to use at least a first interlace and a second interlace for a same transmission.

According to an embodiment, the first and the second interlace together comprise subchannels arranged in a continuous manner in the frequency domain.

According to an embodiment, the device is to select a number of interlaces to be used for a same transmission in accordance with a maximum number ($L_{max}$) of interlaces allowed in a configuration of the wireless communication network According to an embodiment, the device is to receive a signaling, e.g., from a base station, indicating an interlace configuration in the sidelink and to operate accordingly.

According to an embodiment, the device is to signal a reservation of one or more future resource(s) by the device, the reservation being associated with at least one interlace configuration for the future resource reservations.

According to an embodiment, the device is to signal the reservation in a physical sidelink control channel, PSCCH, of the sidelink, e.g., by transmitting a sidelink control information, SCI.

According to an embodiment, the device is to signal, as part of the reservation, the interlace configuration to indicate a starting interlace ($m_0$) and a number (L) of interlaces for each future resource reservation.

According to an embodiment, the device is to signal the starting interlace ($m_0$) and a number (L) of interlaces as a resource indication value, RIV, per future resource reservation.

According to an embodiment, the device is to use a same interlace configuration for a plurality of future resource reservations for at least one of:

a predefined amount of time;

a predefined number of reservations; and until a different interlace configuration is signaled.

For example, all of, for example, 3 transmissions, i.e. the current and the at max 2 future transmissions, all of them will use the same interlace configurations.

According to an embodiment, the device is to signal, as part of the reservation, the interlace configuration to indicate a starting interlace ($m_0$) and a number (L) of reserved interlaces for a reservation; and to expect the reservation to be valid for a predefined number, e.g., at most 2, of future slots and to use the interlace configuration in the future slots. For example, the reservation is valid for a specific number of future interlaces, i.e., the future interlaces are part of reservation which may lead to additional reservations for those interlaces being unnecessary, leading to a low amount of data to be transmitted.

According to an embodiment, the device is to transmit the interlace configuration instead of a lowest subchannel index used for allocation; or expects other devices to reinterpret a subchannel allocation field to indicate the lowest interlace L of a reserved transmission grant.

According to an embodiment, the device is to generate a reservation information indicating a reservation in time, TRIV, and/or a first starting interlace ($m_{0\_2}$) associated for a first interlace configuration used in a first slot and/or a second starting interlace ($m_{0\_1}$) associated with a interlace configuration used in a second slot. The reservation in time is valid for the first slot and the second slot.

According to an embodiment, the device is to determine a granularity of starting interlaces ($m_0$) being larger than 1, and to monitor in a physical sidelink control channel, PSCCH, e.g., a first stage SCI, only interlaces where a device is allowed to select its own starting interlace ($m_0$); or to skip, in the physical sidelink control channel, PSCCH, interlaces where a device is not allowed to select its own starting interlace ($m_0$) from monitoring.

According to an embodiment, the device is to monitor at least a part of the sidelink, e.g., a physical sidelink control channel, PSCCH, of the sidelink, for a reservation of a number of at least one future interlace signaled by a different device, and to avoid the signaled future interlace from a use for an own transmission.

According to an embodiment, the parameter L defines the number of interlaces used for a transmission.

According to an embodiment, the device is to receive, from the wireless communication network, a resource pool configuration indicating a set of values (L) related to a configuration of an interlace; and to select one of the values for a transmission according to a requirement of the device. Optionally, the set of values (L) may also relate to a spacing between the subsequent subchannels in the interlace.

According to an embodiment, the device is to monitor a physical sidelink control channel to obtain a first stage sidelink control information, SCI, indicating a reservation of other devices for future interlaces; and/or for using the first stage SCI for decoding a physical sidelink shared channel, PSSCH to obtain a second stage SCI containing information for a receiver of a signal transmitted in the PSSCH.

According to an embodiment, the device is to obtain, from the first stage SCI, a set of reservations, e.g., a parameter such as RIV or relating to all reservations received, comprising at least one future resource reservation of an interlace configuration, wherein the device is to determine, from the interlace configuration [$m_0$, L] obtained from the first stage SCI, a starting interlace ($m_0$) and a number (L) of interlaces [definition as RIV above]; wherein the device is to consider an interlace in the future slot that is not reserved according to the received interlace configurations as a candidate for an own use.

According to an embodiment, he device is to obtain a plurality of first stage SCI indicating a corresponding plurality of sets of reservations; each set indicating an interlace configuration, wherein the device is to consider an interlace in the future slot that is not reserved by the plurality of sets as a candidate for an own use.

According to an embodiment, the device is to decode a control channel, PSCCH, and a shared channel, PSSCH of the sidelink according to a same or different interlace mapping of interlaces.

According to an embodiment, the device is to decode a first stage sidelink control information, SCI, from a physical sidelink control channel, PSCCH, of the sidelink to obtain information indicating on which interlace indexes of the sidelink a physical sidelink shared channel, PSSCH, is located and to use this information to decode a second stage SCI and/or a data portion from the PSSCH.

According to an embodiment, a base station to operate a wireless communication network is provided, wherein the base station is to allocate sidelink resources of a sidelink of the wireless communication network to a plurality of interlaces.

According to an, embodiment, a wireless communication network comprises a device described herein and a base station to configure the sidelink.

According to an embodiment, the base station is to provide, to the device, a resource pool configuration, e.g., a parameter SL-ResourcePool, indicating a location of the plurality of interlaces in time and frequency.

According to an embodiment, the base station is to provide the resource pool configuration so as to indicate a number of interlaces of the plurality of interlaces and, optionally, a number ($L_{max}$) of the plurality of interlaces the device is allowed to aggregate for a transmission, e.g., within a reservation of interlaces.

According to an embodiment, a method for operating a device comprising a wireless interface, the device being configured for communicating in a wireless communication network using sidelink communication over a sidelink; the sidelink being operated so as to comprise a plurality of subchannels, each subchannel having at least one physical resource block, PRB, —the sidelink being operated such that the plurality of subchannels form a plurality of interlaces, each interlace comprising a disjoint subset of the plurality of subchannels—and wherein the subchannels or PRBs of an interlace are arranged in a discontinuous manner in the frequency range; comprises:

selecting, with the device, at least one interlace for communication from the plurality of interlaces, e.g., for communicating on the sidelink by use of the selected interlace.

According to an embodiment, a method for operating a base station to operate a wireless communication network, comprises allocating sidelink resources of a sidelink of the wireless communication network to a plurality of interlaces.

According to an embodiment, a computer readable digital storage medium having stored thereon a computer program having a program code for performing, when running on a computer, a method described herein.

Computer Program Product

Embodiments of the present invention provide a computer program product comprising instructions which, when the program is executed by a computer, causes the computer to carry out one or more methods in accordance with the present invention.

General

Embodiments of the present invention have been described in detail above, and the respective embodiments and aspects may be implemented individually or two or more of the embodiments or aspects may be implemented in combination.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, the user device, UE, described herein may be one or more of a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and entailing input from a gateway node at periodic intervals, or a mobile terminal, or a stationary terminal, or a cellular IoT-UE, or a vehicular UE, or a vehicular group leader, GL, UE, or an IoT, or a narrowband IoT, NB-IoT, device, or a WiFi non Access Point STAtion, non-AP STA, e.g., 802.11ax or 802.11be, or a ground based vehicle, or an aerial vehicle, or a drone, or a moving base station, or a road side unit, or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

The base station, BS, described herein may be implemented as mobile or immobile base station and may be one or more of a macro cell base station, or a small cell base station, or a central unit of a base station, or a distributed unit of a base station, or an Integrated Access and Backhaul, IAB, node, or a road side unit, or a UE, or a group leader, GL, or a relay, or a remote radio head, or an AMF, or an SMF, or a core network entity, or mobile edge computing entity, or a network slice as in the NR or 5G core context, or a WiFi AP STA, e.g., 802.11ax or 802.11be, or any transmission/reception point, TRP, enabling an item or a device to communicate using the wireless communication network, the item or device being provided with network connectivity to communicate using the wireless communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 13:
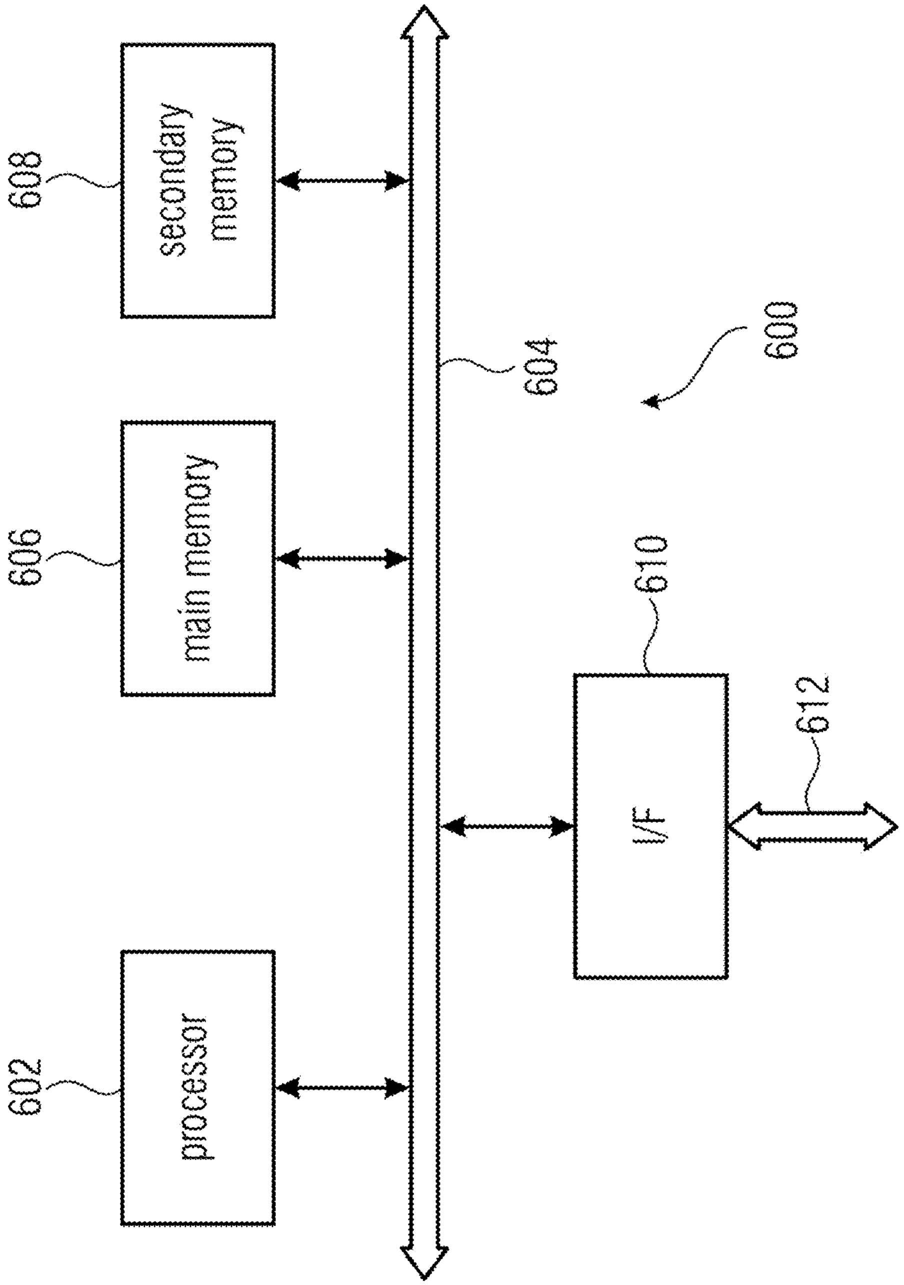
FIG. 13 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 13 illustrates an example of a computer system 600. The units or modules as well as the steps of the methods performed by these units may execute on one or more computer systems 600. The computer system 600 includes one or more processors 602, like a special purpose or a general-purpose digital signal processor. The processor 602 is connected to a communication infrastructure 604, like a bus or a network. The computer system 600 includes a main memory 606, e.g., a random-access memory, RAM, and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

In the following, additional embodiments and aspects of the invention will be described which can be used individually or in combination with any of the features and functionalities and details described herein.

According to a first aspect, a device may have a wireless interface, the device being configured for communicating in a wireless communication network using sidelink communication over a sidelink; the sidelink being operated so as to comprise a plurality of subchannels; each subchannel having at least one physical resource block, PRB, —the sidelink being operated such that the plurality of subchannels form a plurality of interlaces, each interlace comprising a disjoint subset of the plurality of subchannels; —and wherein the subchannels or PRBs of an interlace are arranged in a discontinuous manner in the frequency range; wherein the device is to select at least one interlace for communication from the plurality of interlaces.

According to a second aspect when referring back to the first aspect, the subchannels or PRBs used for a transmission or reception may be determined by an intersection of the resources associated with the selected interlace and the associated SL resource pool.

According to a third aspect when referring back to the first aspect, the sidelink is a sidelink organized by the wireless communication network, e.g., in mode 1, or is organized partially by the device, e.g., in mode 2.

According to a fourth aspect when referring back to the first aspect, the device is to transmit an interlaced transmission in the sidelink using the wireless interface by accessing the selected; and/or wherein the device is to receive an interlaced transmission in the sidelink using the wireless interface by decoding resources associated to the selected interface.

According to a fifth aspect when referring back to any of the first to fourth aspects, the subchannels of different interlaces are arranged with a same periodicity in a frequency domain.

According to a sixth aspect when referring back to any of the first to fifth aspects, the plurality of subchannels is representable as an enumerated sequence of subchannels being sequentially arranged in a frequency domain; wherein each of the plurality of interlaces is based on an intersection of a set of subchannels, the set being based on a starting subchannel [$m_0$] of the enumerated sequence and a periodicity (M) of subchannels into which the plurality is grouped on the one hand [description for P]; and a resource pool of the sidelink on the other hand.

According to a seventh aspect when referring back to any of the first to sixth aspects, the device is to use at least a first interlace and a second interlace for a same transmission.

According to an eighth aspect when referring back to the seventh aspect, the first and the second interlace together comprise subchannels arranged in a continuous manner in the frequency domain.

According to a ninth aspect when referring back to the seventh or eighth aspect, the device is to select a number of interlaces to be used for a same transmission in accordance with a maximum number ($L_{max}$) of interlaces allowed in a configuration of the wireless communication network.

According to a tenth aspect when referring back to any of the first to ninth aspects, the device is to receive a signaling, e.g., from a base station, indicating an interlace configuration in the sidelink and to operate accordingly.

According to an eleventh aspect when referring back to any of the first to tenth aspects, the device is to signal a reservation of one or more future resource(s) by the device, the reservation being associated with at least one interlace configuration for the future resource reservations.

According to a twelfth aspect when referring back to the eleventh aspect, the device is to signal the reservation in a physical sidelink control channel, PSCCH, of the sidelink, e.g., by transmitting a sidelink control information, SCI.

According to a thirteenth aspect when referring back to the eleventh or twelfth aspect, the device is to signal, as part of the reservation, the interlace configuration to indicate a starting interlace ($m_0$) and a number (L) of interlaces for each future resource reservation.

According to a fourteenth aspect when referring back to the thirteenth aspect, the device is to signal the starting interlace ($m_0$) and a number (L) of interlaces as a resource indication value, RIV, per future resource reservation.

According to a fifteenth aspect when referring back to any of the eleventh to fourteenth aspects, the device is to use a same interlace configuration for a plurality of future resource reservations for at least one of:

a predefined amount of time;

a predefined number of reservations; and until a different interlace configuration is signaled.

According to a sixteenth aspect when referring back to the fifteenth aspect, the device is to signal, as part of the reservation, the interlace configuration to indicate a starting interlace ($m_0$) and a number (L) of reserved interlaces for a reservation; and to expect the reservation to be valid for a predefined number, e.g., at most 2, of future slots and to use the interlace configuration in the future slots.

According to a seventeenth aspect when referring back to the sixteenth aspect, the device is to transmit the interlace configuration instead of a lowest subchannel index used for allocation; or expects other devices to reinterpret a subchannel allocation field to indicate the lowest interlace L of a reserved transmission grant.

According to an eighteenth aspect when referring back to any of the eleventh to seventeenth aspects, the device is to generate a reservation information indicating a reservation in time, TRIV, and/or a first starting interlace ($m_{0\_2}$) associated for a first interlace configuration used in a first slot and/or a second starting interlace ($m_{0\_1}$) associated with a interlace configuration used in a second slot; wherein the reservation in time is valid for the first slot and the second slot.

According to a nineteenth aspect when referring back to any of the eleventh to eighteenth aspects, the device is to determine a granularity of starting interlaces ($m_0$) being larger than 1, and to monitor in a physical sidelink control channel, PSCCH, e.g., a first stage SCI, only interlaces where a device is allowed to select its own starting interlace ($m_0$); or to skip, in the physical sidelink control channel, PSCCH, interlaces where a device is not allowed to select its own starting interlace ($m_0$) from monitoring.

According to a twentieth aspect when referring back to any of the first to nineteenth aspects, the device is to monitor at least a part of the sidelink, e.g., a physical sidelink control channel, PSCCH, of the sidelink, for a reservation of a number of at least one future interlace signaled by a different device, and to avoid the signaled future interlace from a use for an own transmission.

According to a twenty-first aspect when referring back to any of the first to twentieth aspects, L defines the number of interlaces used for a transmission.

According to a twenty-second aspect when referring back to any of the first to twenty-first aspects, the device is to receive, from the wireless communication network, a resource pool configuration indicating a set of values (L) related to a configuration of an interlace; and to select one of the values for a transmission according to a requirement of the device.

According to a twenty-third aspect when referring back to any of the first to twenty-second aspects, the device is to monitor a physical sidelink control channel to obtain a first stage sidelink control information, SCI, indicating a reservation of other devices for future interlaces; and/or for using the first stage SCI for decoding a physical sidelink shared channel, PSSCH to obtain a second stage SCI containing information for a receiver of a signal transmitted in the PSSCH.

According to a twenty-fourth aspect when referring back to the twenty-third aspect, the device is to obtain, from the first stage SCI, a set of reservations comprising at least one future resource reservation of an interlace configuration, wherein the device is to determine, from the interlace configuration ($m_0$, L) obtained from the first stage SCI, a starting interlace ($m_0$) and a number (L) of interlaces [definition as RIV above]; wherein the device is to consider an interlace in the future slot that is not reserved according to the received interlace configurations as a candidate for an own use.

According to a twenty-fifth aspect when referring back to the twenty-fourth aspect, the device is to obtain a plurality of first stage SCI indicating a corresponding plurality of sets of reservations; each set indicating an interlace configuration, wherein the device is to consider an interlace in the future slot that is not reserved by the plurality of sets as a candidate for an own use.

According to a twenty-sixth aspect when referring back to any of the first to twenty-fifth aspects, the device is to decode a control channel, PSCCH, and a shared channel, PSSCH of the sidelink according to a same or different interlace mapping of interlaces.

According to a twenty-seventh aspect when referring back to any of the first to twenty-sixth aspects, the device is to decode a first stage sidelink control information, SCI, from a physical sidelink control channel, PSCCH, of the sidelink to obtain information indicating on which interlace indexes of the sidelink a physical sidelink shared channel, PSSCH, is located and to use this information to decode a second stage SCI and/or a data portion from the PSSCH.

A twenty-eighth aspect may have a base station to operate a wireless communication network, wherein the base station is to allocate sidelink resources of a sidelink of the wireless communication network to a plurality of interlaces.

According to a twenty-ninth aspect, a wireless communication network may have: a device of any of the first to twenty-seventh aspects; and a base station to configure the sidelink.

According to a thirtieth aspect when referring back to the twenty-ninth aspect, the base station is a base station according to the twenty-eighth aspect.

According to a thirty-first aspect when referring back to the twenty-ninth or thirtieth aspect, the base station is to provide, to the device, a resource pool configuration indicating a location of the plurality of interlaces in time and frequency.

According to a thirty-second aspect when referring back to the thirty-first aspect, the base station is to provide the resource pool configuration so as to indicate a number of interlaces of the plurality of interlaces and, optionally, a number ($L_{max}$) of the plurality of interlaces the device is allowed to aggregate for a transmission, e.g., within a reservation of interlaces.

According to a thirty-third aspect, a method for operating a device comprising a wireless interface, the device being configured for communicating in a wireless communication network using sidelink communication over a sidelink; the sidelink being operated so as to comprise a plurality of subchannels, each subchannel having at least one physical resource block, PRB, —the sidelink being operated such that the plurality of subchannels form a plurality of interlaces, each interlace comprising a disjoint subset of the plurality of subchannels—and wherein the subchannels or PRBs of an interlace are arranged in a discontinuous manner in the frequency range; may have the step of: selecting, with the device, at least one interlace for communication from the plurality of interlaces.

According to a thirty-fourth aspect, a method for operating a base station to operate a wireless communication network may have the step of: allocating sidelink resources of a sidelink of the wireless communication network to a plurality of interlaces.

According to a thirty-fifth aspect, a computer readable digital storage medium may have stored thereon a computer program having a program code for performing, when running on a computer, a method according to the thirty-third or thirty-fourth aspect.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier, or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device, comprising:

a wireless interface, the device being configured for communicating in a wireless communication network using sidelink communication over a sidelink, the sidelink being operated so as to comprise a plurality of subchannels, each of the plurality of subchannels comprising at least one Physical Resource Block, (PRB), wherein the sidelink is operated such that the plurality of subchannels form a plurality of interlaces, each interlace comprising a disjoint subset of the plurality of subchannels, wherein the plurality of subchannels or PRBs of an interlace are arranged in a discontinuous manner in the frequency range, wherein the device is configured to select at least one interlace for communication from the plurality of interlaces, wherein the device is to signal a reservation of one or more future resources by the device, the reservation being associated with at least one interlace configuration for the future resource reservations, and wherein the plurality of subchannels is representable as an enumerated sequence of subchannels being sequentially arranged in a frequency domain;

wherein each of the plurality of interlaces is based on an intersection of a) a set of subchannels, the set being based on a starting subchannel $[m_0]$ of the enumerated sequence and a periodicity of subchannels into which the plurality is grouped on the one hand; and b) a resource pool of the sidelink on the other hand; or wherein the device is configured to generate a reservation information indicating a reservation in time, TRIV, and/or a first starting interlace associated for a first interlace configuration used in a first slot and/or a second starting interlace associated with a interlace configuration used in a second slot; wherein the reservation in time is valid for the first slot and the second slot.

2. The device of claim 1, wherein the plurality of subchannels or PRBs used for a transmission or reception are determined by an intersection of the resources associated with the selected interlace and an associated SL resource pool.

3. The device of claim 1, wherein the sidelink is a sidelink organized by the wireless communication network in a first mode, or is organized partially by the device in a second mode.

4. The device of claim 1, wherein the plurality of subchannels of different interlaces are arranged with a same periodicity in a frequency domain.

5. The device of claim 1, wherein the device is configured to use at least a first interlace and a second interlace for a same transmission.

6. The device of claim 5, wherein the first and the second interlace together comprise subchannels arranged in a continuous manner in the frequency domain.

7. The device of claim 5, wherein the device is configured to select a number of interlaces to be used for a same transmission in accordance with a maximum number of interlaces allowed in a configuration of the wireless communication network.

8. The device of claim 1, wherein the device is configured to receive a signaling from a base station indicating an interlace configuration in the sidelink and to operate accordingly.

9. The device of claim 1, wherein the device is configured to transmit an interlaced transmission in the sidelink using the wireless interface by accessing the selected; and/or wherein the device is configured to receive an interlaced transmission in the sidelink using the wireless interface by decoding resources associated to the selected interlace.

10. The device of claim 1, wherein the device is configured to signal the reservation in a Physical Sidelink Control Channel (PSCCH) of the sidelink, by transmitting a Sidelink Control Information (SCI).

11. The device of claim 1, wherein the device is configured to signal, as part of the reservation, the interlace configuration to indicate a starting interlace and a number of interlaces for each future resource reservation.

12. The device of claim 11, wherein the device is configured to signal the starting interlace and a number of interlaces as a Resource Indication Value, (RIV), per future resource reservation.

13. The device of claim 1, wherein the device is configured to use a same interlace configuration for a plurality of future resource reservations for at least one of:

a predefined amount of time;

a predefined number of reservations; and until a different interlace configuration is signaled.

14. The device of claim 13, wherein the device is configured to signal, as part of the reservation, the interlace configuration to indicate a starting interlace and a number of reserved interlaces for a reservation; and to expect the reservation to be valid for a predefined number of future slots and to use the interlace configuration in the future slots.

15. The device of claim 1 wherein the device is configured to receive, from the wireless communication network, a resource pool configuration indicating a set of values related to a configuration of an interlace; and to select one of the values for a transmission according to a requirement of the device.

16. The device of claim 15, wherein the set of values defines the number of interlaces used for a transmission.

17. A base station configured to operate a wireless communication network, wherein the base station is configured to allocate sidelink resources of a sidelink of the wireless communication network to a plurality of interlaces for the device according to claim 1.

18. A method for operating a device including a wireless interface, the device being configured for communicating in a wireless communication network using sidelink communication over a sidelink, the sidelink being operated so as to include a plurality of subchannels, each of the plurality of subchannels including at least one Physical Resource Block (PRB), the sidelink being operated such that the plurality of subchannels form a plurality of interlaces, each interlace including a disjoint subset of the plurality of subchannels and wherein the subchannels or the at least one PRB of an interlace are arranged in a discontinuous manner in the frequency range; the method comprising:

selecting, with the device, at least one interlace for communication from the plurality of interlaces; and signaling a reservation of one or more future resources by the device, the reservation being associated with at least one interlace configuration for the future resource reservations;

such that the plurality of subchannels is representable as an enumerated sequence of subchannels being sequentially arranged in a frequency domain; wherein each of the plurality of interlaces is based on an intersection of a) a set of subchannels, the set being based on a starting subchannel $[m_0]$ of the enumerated sequence and a periodicity of subchannels into which the plurality is grouped on the one hand; and b) a resource pool of the sidelink on the other hand; or wherein the device is configured to generate a reservation information indicating a reservation in time, TRIV, and/or a first starting interlace associated for a first interlace configuration used in a first slot and/or a second starting interlace associated with a interlace configuration used in a second slot; such that the reservation in time is valid for the first slot and the second slot.

* * * * *